United States Patent
Hurtado et al.

(10) Patent No.: US 12,531,201 B2
(45) Date of Patent: Jan. 20, 2026

(54) HIGH VOLTAGE VACUUM TUBES

(71) Applicant: Morgan Advanced Ceramics, Inc., Hayward, CA (US)

(72) Inventors: Edgar Vanegas Hurtado, Hayward, CA (US); Nathan Russell Daubenmier, Hayward, CA (US); Thomas A. Sandin, Hayward, CA (US); Antonio Ramirez, Hayward, CA (US); Dharmendra Chalasani, Hayward, CA (US)

(73) Assignee: MORGAN ADVANCED CERAMICS, INC., Hayward, CA (US)

( * ) Notice: Subject to any disclaimer, the term of this patent is extended or adjusted under 35 U.S.C. 154(b) by 0 days.

(21) Appl. No.: 19/079,814

(22) Filed: Mar. 14, 2025

(65) Prior Publication Data
US 2025/0246395 A1 Jul. 31, 2025

Related U.S. Application Data

(63) Continuation of application No. 18/851,608, filed as application No. PCT/US2024/029689 on May 16, 2024, now Pat. No. 12,283,449.
(Continued)

(51) Int. Cl.
*B23K 1/00* (2006.01)
*B23K 35/30* (2006.01)
(Continued)

(52) U.S. Cl.
CPC ............. *H01J 35/16* (2013.01); *B23K 1/00* (2013.01); *B23K 35/302* (2013.01); *C22C 9/00* (2013.01);
(Continued)

(58) Field of Classification Search
None
See application file for complete search history.

(56) References Cited

U.S. PATENT DOCUMENTS 3,083,451 A 4/1963 Atkinson
3,103,741 A 9/1963 Stoeckert et al.
(Continued)

FOREIGN PATENT DOCUMENTS

CN 111299901 A * 6/2020 ............. B23K 35/40
GB 1491044 A 11/1977
(Continued)

OTHER PUBLICATIONS

Ivanova et al., Complex of physical properties of melts as criteria of solder properties, Svarochnoe Proizvodstvo (1979), (1), pp. 5-6 (Year: 1979).*
(Continued)

*Primary Examiner* — Elizabeth Collister
(74) *Attorney, Agent, or Firm* — Armstrong Teasdale LLP

(57) ABSTRACT

The present disclosure relates to a high voltage vacuum tube including:
  a vacuum tube envelope including an interior;
  an anode assembly disposed within the interior of the vacuum tube envelope; and
  a cathode assembly disposed within interior of the vacuum tube envelope
  that emits an electron beam to strike a target surface of the anode
  assembly and form electromagnetic radiation.
The high voltage vacuum tube includes a braze assembly, the braze assembly including a first component and a second component joined together by a first braze joint, the first braze joint including a composition configured to include a solidification temperature range of no more than 90° C. and a liquidus temperature in the range of 950° C. to 1060° C.;
(Continued)

the braze joint including no more than 30.0 wt % in total of one of more precious metals selected from Au, Pd and Pt, relative to the total weight of the first braze joint.

27 Claims, 10 Drawing Sheets

Related U.S. Application Data

(60) Provisional application No. 63/467,054, filed on May 17, 2023.

(51) Int. Cl.
    *C22C 9/00*    (2006.01)
    *H01J 35/16*   (2006.01)

(52) U.S. Cl.
    CPC ..... *H01J 2235/083* (2013.01); *H01J 2235/16* (2013.01)

(56) References Cited

U.S. PATENT DOCUMENTS

| | | |
|---|---|---|
| 3,903,585 A | 9/1975 | Kosteruk et al. |
| 4,124,380 A | 11/1978 | Youdelis |
| 4,866,748 A | 9/1989 | Caraher et al. |
| 4,993,054 A | 2/1991 | Ujari |
| 5,158,621 A | 10/1992 | Das et al. |
| 6,015,325 A | 1/2000 | Inazuru et al. |
| 2006/0140344 A1 | 6/2006 | Xu et al. |
| 2012/0288401 A1 | 11/2012 | Cho |
| 2013/0248586 A1 | 9/2013 | Harris |
| 2017/0008130 A1 | 1/2017 | Miklos et al. |
| 2021/0210783 A1 | 7/2021 | Nagasawa et al. |

FOREIGN PATENT DOCUMENTS

| | | | |
|---|---|---|---|
| JP | S63317277 A | * | 12/1988 |
| KR | 101154183 B1 | | 6/2012 |
| WO | 9513900 A1 | | 5/1995 |
| WO | 2017005620 A1 | | 1/2017 |

OTHER PUBLICATIONS

Machine translation of Ivanova et al., Complex of physical properties of melts as criteria of solder properties via google translate, translated Jul. 24, 2025 (Year: 1979).*
Severin, Selecting brazing materials, Advanced Materials & Processes, Feb. 1999, pp. 1-8, (Year: 1999).*
Machine translation of JPS63317277A via EPO, translated Jul. 24, 2025 (Year: 1988).*
Machine translation of CN111299901A via EPO, translated Jul. 24, 2025 (Year: 2020).*
Machine translation of CN111299901A, translated Jul. 24, 2025 via EPO. (Year: 2020).*
International Search Report and Written Opinion for PCT/US24/29689 issued on Aug. 21, 2024, 12 pages.

* cited by examiner

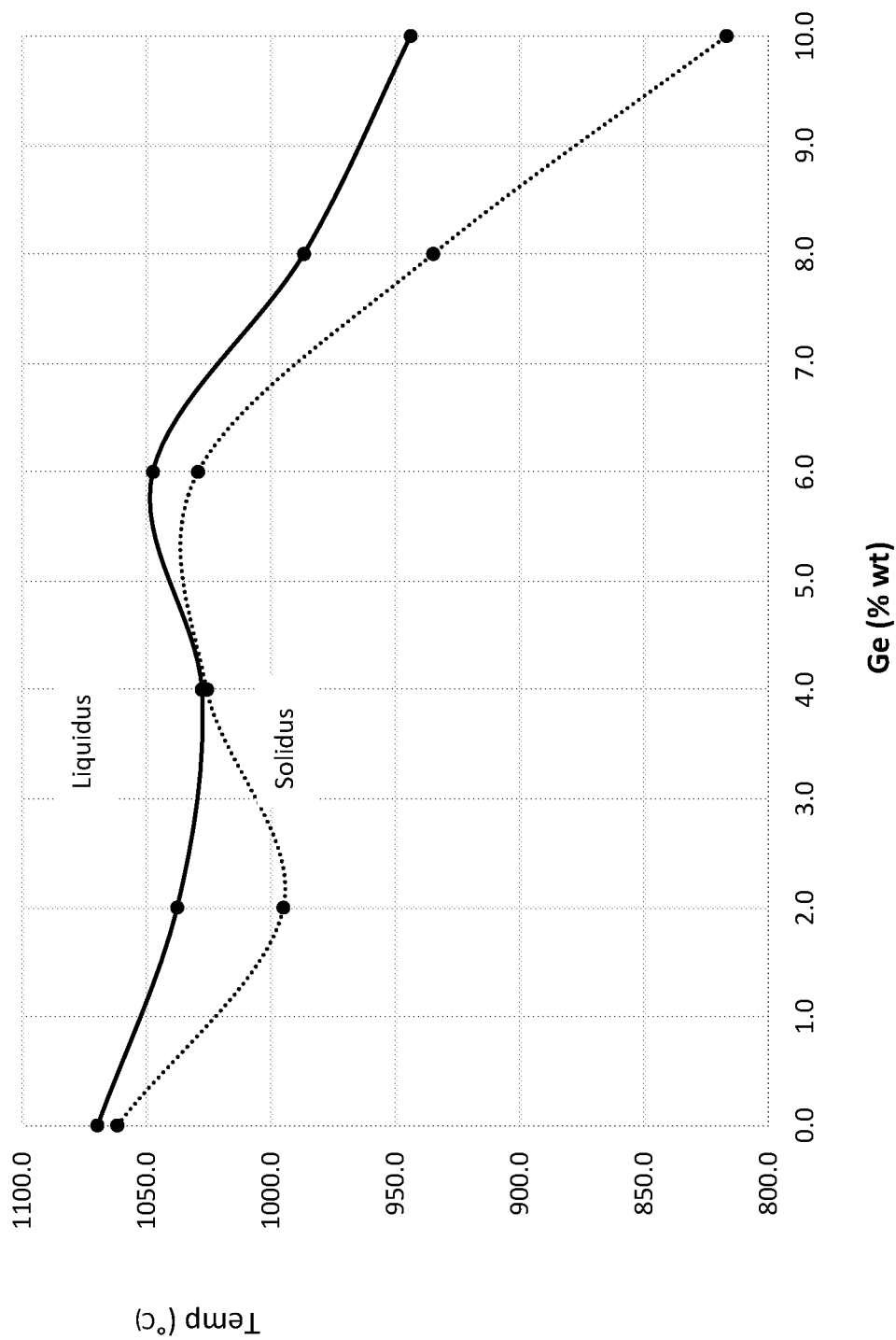

HIGH VOLTAGE VACUUM TUBES

CROSS-REFERENCE TO RELATED APPLICATIONS

This application is a continuation application of U.S. patent application Ser. No. 18/851,608, filed Sep. 26, 2024, which is a U.S. National Phase Application of International Patent Application No. PCT/US24/29689, filed May 16, 2024, which claims priority to U.S. Provisional Patent Application No. 63/467,054, filed May 17, 2023, each of which is hereby incorporated by reference herein.

FIELD

This disclosure relates to high voltage vacuum tubes and in particular, x-ray tubes; and the process of producing braze joints therein.

BACKGROUND TO THE DISCLOSURE

High voltage vacuum tubes comprise an anode and a cathode, which are disposed opposite one another in a vacuumized inner space. The vacuumized inner space is typically enclosed by a cylindrical metal housing, with the anode and/or cathode being electrically insulated by means of an annular insulator.

The high voltage vacuum tube is a device which controls electric current flow in a high vacuum between electrodes, with a considerable amount of heat produced from both the filament (heater) and the electron bombardment onto the anode. High voltage applications of vacuum tubes include x-ray tubes, magnetrons, traveling-wave tubes, carcinotrons and klystrons.

High voltage vacuum tubes typically use ceramic insulators to offset a high voltage from a lower voltage. For example, an anode at a high voltage may be offset from a body of the vacuum tube by the ceramic insulator. The body of the vacuum tube is typically attached to a ceramic insulator. A metallic seal ring may be brazed onto an outer surface of the ceramic insulator to attach the body to the ceramic insulator. This attachment creates a triple junction between the ceramic insulator, the seal ring, and a surrounding media. An electric field at this triple junction may be relatively high, resulting in electrons that may become the source of arcing and/or punctures. High voltage structures with an insulator forming part of a vacuum chamber are known from U.S. Pat. No. 4,126,803.

X-ray tubes for various applications are known to be operated with high direct or alternating voltages applied between the anode and the cathode, and depending on the desired radiation intensity, the voltages applied reach up to several 100 kV. In such x-ray tubes, the necessary insulating paths are arranged predominantly in the axial direction.

Braze materials for the X-ray tubes may be selected to achieve the desired wetting and braze flow, such as a 50/50 mix of Au/Cu, 81.5/16.5 mix of Au/Cu (Nicoro™-80), and 82/18 mix of Au/Cu (Nioro™).

Gold copper braze materials are part of a broader family of high temperature braze materials based on precious metals (palladium, platinum, gold and silver) with nickel and copper additions. They possess good mechanical properties at elevated temperature and good oxidation resistance. Cu—Ge based alloys are often used as an alternative to precious metal braze alloys (e.g. Au—Cu and Cu—Ag based alloys) for vacuum brazing applications.

Non-precious metal alloys, such as Cu—Ge alloys (tradename Gemco™ with a nominal composition of 87.75% Cu, 12% Ge and 0.25% Ni), have been used for vacuum brazing of copper, steel, and nickel-based metals. However, such an alloy exhibits a wide range between their solidus and liquidus temperatures known as the solidification temperature range (STR), which create a liquation problem in brazing applications. Liquation in brazing is defined as the tendency of the lower-melting constituents of a braze alloy to separate out and flow away from the higher-melting constituents of the braze alloy during heating. It occurs when the alloy is heated slowly through that melting range such as when furnace brazing and it manifests as a non-melted skull of alloy that remains at the point where the braze alloy was applied. This often leads to poor joint strength due to the presence of a brittle intermetallic phase in the brazed joint. Liquation is usually apparent in alloys having a large STR. Brazing operations conducted within a furnace which has temperature variations are also prone to liquation, particularly if the braze alloy comprises a large STR.

Another problem with high STR braze alloys is their inability to be used in step-brazing when a lower temperature alloy is used in step to braze complex joints. During step brazing, the liquidus temperature of the low temperature braze is close to the solidus temperature of the high temperature braze (due to the high STR of the latter), which causes a dimensional shift of the components.

There is still a need for high voltage vacuum tubes containing alternatives to conventional braze alloys/joints with a high precious metal content. However, the braze joint needs to have a sufficiently small STR to avoid or reduce the risk of liquation compared to conventional non-precious metal braze alloys. Furthermore, the braze alloys need to have sufficient formability to enable the braze alloy to be in a form which enables the braze alloy to be precisely positioned adjacent to x-ray tube components such that the braze alloy, during the brazing process, may be drawn into a gap between the components by capillary action.

SUMMARY OF THE DISCLOSURE

In a first aspect of the present disclosure, there is provided a high voltage vacuum tube comprising:
  a vacuum tube envelope comprising an interior;
  an anode assembly disposed within the interior of the vacuum tube envelope; and
  a cathode assembly disposed within interior of the vacuum tube envelope that emits an electrode beam to strike a target surface of the anode assembly and form electromagnetic radiation,
wherein said high voltage vacuum tube comprises a braze assembly, said braze assembly comprising a first component and a second component joined together by a first braze joint, said first braze joint comprising a composition configured to comprise a solidification temperature range of no more than 90° C. and a liquidus temperature in the range of 950° C. to 1060° C.; said braze joint comprising no more than 18.0 wt % in total of one of more precious metals selected from Au, Pd and Pt, relative to the total weight of the first braze joint, wherein at least a portion of the braze joint is exposed to the interior of the vacuum tube envelope and wherein at least one of the first and second component form part of one or more of the vacuum tube envelope, the anode assembly and the cathode assembly.

In a variation of the first aspect of the present disclosure, there is provided an x-ray tube comprising:
an x-ray tube envelope comprising an interior;
an anode assembly disposed within the interior of the x-ray tube envelope; and
a cathode assembly disposed within interior of the x-ray tube envelope that emits an electrode beam to strike a target surface of the anode assembly and form electromagnetic radiation,
wherein said x-ray tube comprises a braze assembly, said braze assembly comprising a first component and a second component joined together by a first braze joint, said first braze joint comprising a composition configured to comprise a solidification temperature range of no more than 90° C. and a liquidus temperature in the range of 950° C. to 1060° C.; said braze joint comprising no more than 18.0 wt % in total of one of more precious metals selected from Au, Pd and Pt, relative to the total weight of the first braze joint, wherein at least a portion of the braze joint is exposed to the interior of the x-ray tube envelope and wherein at least one of the first and second component form part of one or more of the x-ray tube envelope, the anode assembly and the cathode assembly.

The anode assembly is a rotating anode assembly. Rotating anode assemblies are place under significant forces during operation and therefore the strength of the braze joints are critical.

In some embodiments, at least one of the first and second components form part of the x-ray tube or vacuum tube envelope. In some embodiments, at least one of the first and second components form part of the anode or the cathode assembly.

High voltage vacuum tubes preferably comprise a cathode and an anode which is capable of operating at at least 800° C. Examples of high voltage vacuum tubes include power tubes, magnetrons, traveling-wave tubes, carcinotrons and klystrons, with the electromagnetic radiation emitted from the cathode assembly including, but not limited to, x-ray and microwaves.

BRIEF DESCRIPTION OF THE FIGURES

The present disclosure will now be described with reference to the figures of the accompanying drawings, which illustrate particularly preferred embodiments of the present disclosure, wherein:

FIG. 10 is a graph illustrating the liquidus and solidus temperature versus the % wt Ge of the braze alloys in accordance with the present disclosure.

DETAILED DESCRIPTION OF A PREFERRED EMBODIMENT OF THE PRESENT DISCLOSURE

High Voltage Vacuum Tube Components

Figure 1:
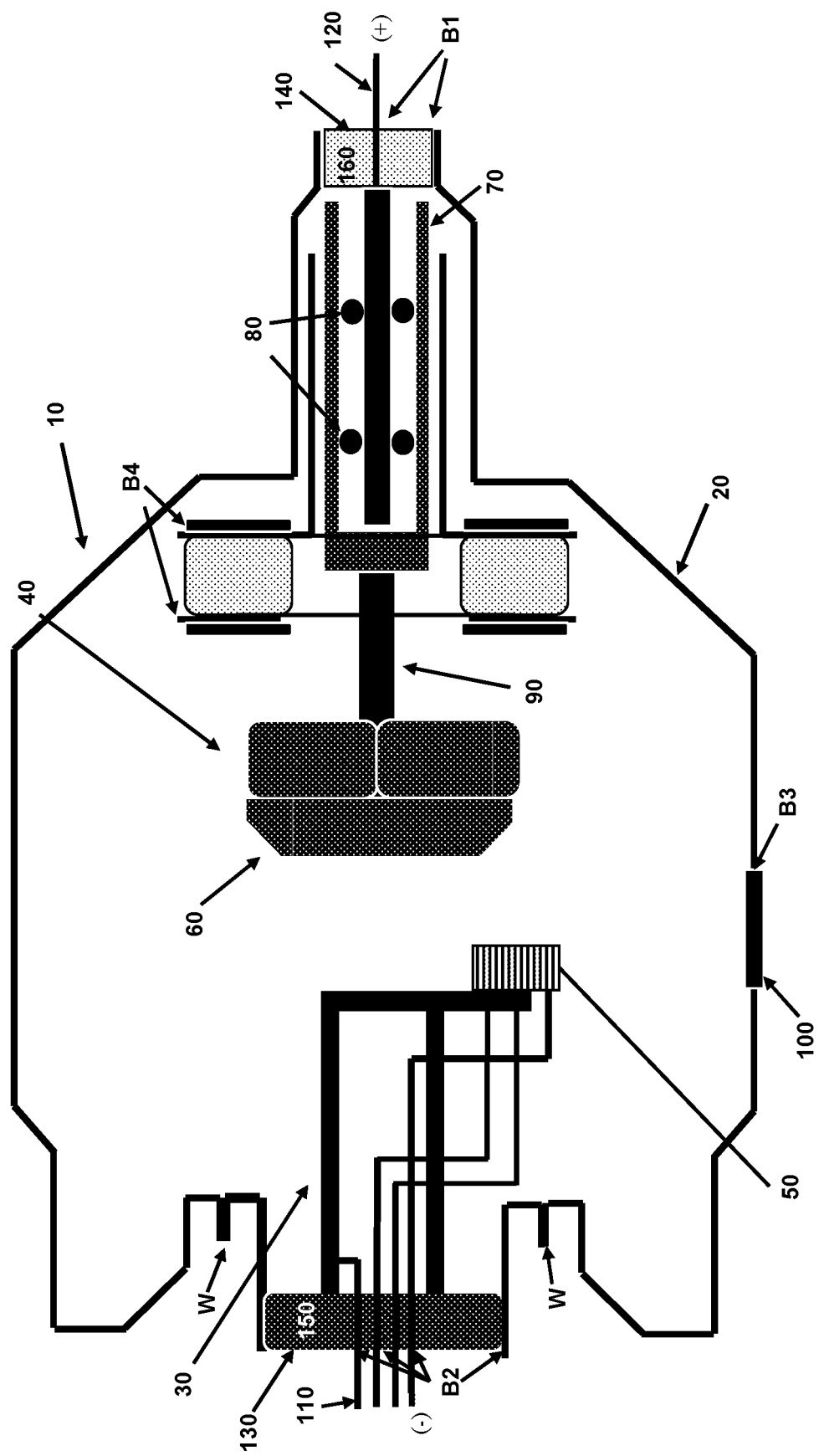
FIG. 1 is a schematic diagram of an x-ray tube in accordance with the present disclosure.

It is to be understood that envelope in the context of the present specification and claims means a high temperature hermetic envelope that is capable of being operated at least 500° C. or at least 800° C. and that is capable of operating under vacuum or containing gases such that the brazed joints therein prevent gases leaking into or out of the envelope. Preferably, the hermeticity is such that the braze joint passes a leak test with a gas tightness of $1\times10^{-6}$ atm·cc/s or less (ASTM F2391 using helium gas).

"Envelope" refers to a vessel, tube or enclosure which defines an enclosed space in which enclosed components, fluid, vacuum or gases may reside. The envelope separates or isolates the enclosed spaced from the space external to the envelope.

"Hermetic" and its variations herein refer to a sealed, gas-tight, and fluid-tight braze joint, vessel, tube, or enclosure relative to the environmental conditions under which a housing or enclosure relative to the environmental conditions under which an envelope described herein would normally be subjected. Hermetic may generally mean that a braze joint is capable of isolating an environment on the outside of a device from the inside of the same device. The envelope may be part of an assembly such as all or part of a high voltage vacuum tube or a semiconductor process chamber component.

Envelopes by their nature typically comprise at least one braze joint one of which necessarily has to be formed as a blind joint (i.e. the joint is not visible). That is, a joint which is formed through the molten braze alloy being drawn into a gap (e.g. 5 μm to 500 μm or to 200 μm) between the two components to be joined (e.g. via capillary action which avoids gas entrapment within the braze joint), often after the sub-assembly components within the envelope are in place. Thus, the braze alloy properties are critical to firstly form the braze alloy composition of the desired dimensions to be placed immediate adjacent the components to be joined. Secondly, the braze joint should have sufficient wettability and flowability for form a high-quality connection (e.g. without liquation) between the components through capillary action. Thirdly, the brazed joint requires sufficient hermeticity, corrosion resistance, high temperature resistance and strength to provide the envelope with long term functional integrity. At least some of the braze joints within the envelope (or other brazed assembly) should be accomplished blindly.

Additionally, the joints of the many designs cannot be inspected after fabrication. This is particularly important because brazed joints require finite gaps for proper brazing. If the manufacturing tolerances vary, a required gap appears only problematical because the final brazing gap is unknown and too large. Consequently, there is a need to maintain the stress carrying capability of the brazed joint and its capacity to be inspected and produced with consistency.

The average thickness of the braze joint is typically in the range of 5 μm to 500 μm or 8 μm to 200 μm or 8 μm to 100 μm. The depth of the braze joint may be in the range of 5 μm to 50 mm or 30 μm to 10 mm or 40 μm to 5.0 mm. In the formation of blind joints, the flowability of the braze is particularly important the greater distance the molten braze alloy is required to flow to cover the require depth of the braze joint.

Such assemblies are typically required to operate at high temperatures and/or with high precision with highly conductive components, such as copper, being integral to their effective thermal management system. In the vacuum tube, the envelope may further comprise a heat source enclosed therein, such as a cathode filament of an x-ray vacuum tube. The heat source is preferably capable of heating at least a portion of the contents of the envelope to at least 800° C. or at least 900° C. or at least 1000° C. The maximum operating temperatures of the envelopes is governed by the softening and liquidus temperatures of the materials used.

The first or the second component may comprise copper or a copper alloy, which has excellent conductivity. The first or the second component may also comprise other metals including, but not limited to, stainless steel, copper alloys or other metal or metal alloys with a liquidus temperature greater than 1050° C. or greater than 1080° C. The envelope may further comprise a cooling system to remove heat from the system.

The first or the second component may also comprise ceramic or a metallised ceramic (i.e., a ceramic comprising a metallised coating).

The envelope comprises an anode and a cathode, which are disposed opposite one another in a vacuumized inner space. The vacuumized inner space may be enclosed by a cylindrical shaped metal envelope, with the anode and/or cathode being electrically insulated by means of an annular insulator (e.g. a ceramic or metallised ceramic component). The braze joint may form a seal between the cylindrical metal envelope and the annular insulator.

The braze joint may comprise a ceramic (or metallised coated ceramic) component and a metallic component, wherein the brazed joint joins the ceramic/metallised coated ceramic and the metallic components together.

The ceramic component may comprise a metallised coating such as a molybdenum-manganese coating or nickel plating.

The wetting/bonding additive(s), when present, may be selected to improve wettability and/or bonding of the alloy on the first and or second component.

The vacuum tubes of the present disclosure may comprise a braze joint formed from a high copper content braze alloy with specific amounts of minor components which may be varied to adjust the desired solidus temperature, whilst maintaining a relatively narrow liquidus solidus temperature range. Further, the braze joints typically have excellent wettability and flowability over a range of base materials including copper, nickel and alloys thereof, stainless steel, nickel cobalt iron alloys and molybdenum-manganese metallised substrates. These brazing alloy properties enable a diverse variety of vacuum tubes to be formed therefrom using a variety of different brazing techniques and conditions.

With reference to FIG. 1, there is illustrated a bi-polar rotating x-ray tube 10 comprising a hermetically sealed envelope 20 maintaining a high vacuum within, in addition to functioning as an intermediate component to connect the cathode 30 and the anode 40. For high voltage vacuum tubes (e.g. 150 kV), the envelope is typically made from stainless steel, heat-resistant steel, carbon structural steel, non-magnetic stainless steel, copper or nickel copper alloys. The envelope may comprise one or more weld seals W which are able to hermetically seal the envelope.

Electrons are generated by heating the cathode filament 50, and under the action of the accelerated electric field between the cathode 30 and anode, the electrons hit the target surface 60 at high speed, thereby generating X-rays. The target surface is a rotating disc made from tungsten which is able to withstand the high temperatures generated by the impacted electrons. The induction motor 70 comprises bearings 80 and a rotor stem 90, which is typically made from molybdenum with its relatively lower conductivity providing the motor a degree of thermal isolation from the target surface 60. The stator (not shown) comprising a series of magnets which are able to drive the rotation of the rotor 90 from outside the envelope 20.

The bombardment of electrons on the target surface release a stream of x-rays, which may be selectively transmitted outside the envelope via an emission window 100. High voltage wires 110, 120 are supplied to the cathode 30 and anode 40, via feedthroughs 130, 140 respectively. The feedthrough comprises conductors 110, 120 which are insulated from the envelope by metallised ceramic seals 150, 160.

Within this structure there is a need for braze alloys which are able to join various components of metal and/or ceramics components. For example, braze joints B1 are required to hermetically seal the envelope with the anode feedthrough 140 as well as a conductor 120 within the ceramic seal 160. A similar set-up is required at the cathode feedthrough with braze joints B2. Further braze joints B3 are required to hermetically seal the x-ray emission window 100 with the envelope 20. Braze joints B4 may be also required to joint components of the rotating anode 40 or cathode 30.

As only 1% of the total energy is used to generate x-rays, with the remaining 99% of the energy converted into heat energy the x-ray vacuum tube is required to comprise of hermetically sealed components with varying degrees of conductivity and mechanical strength, which must maintain good dimensional stability under extreme temperature variations upon start-up.

The housing assembly (not shown) may further comprise a cooling fluid (e.g. oil) which assists in removing the heat from the envelope and maintaining the temperatures to within target operating zone, which are typically up to 800° C., or up to 900° C., or up to 1000° C., or more. With many of the metal components of the vacuum tube and external housing comprising copper due to its high conductivity, the use of copper based braze alloys have the advantages of having similar coefficients of thermal expansions and being able to operate at temperatures required within the vacuum tube. Thus, the braze alloys of the present disclosure may be advantageous used in the braze joints of B1, B2, B3 and B4 to joint metal to metal, metal to metallised ceramics and/or metal to ceramics.

Braze alloys for high voltage vacuum tubes need to exhibit deformability (the ability of the alloy to undergo plastic deformation without breaking), in particular, ductility (under tensile stress), to fabricate in various forms, such as wires and foils. The production of a braze alloy begins with mixing all elements in the alloy in appropriate amounts and melting the mixture to a sufficiently high temperature, followed by casting to produce an ingot or a billet in a solid form. The condition of the alloy can be changed from the as-cast state to the wrought form by cold or hot working such as rolling, drawing, and stamping.

Rapid solidification methods (i.e., under extremely high cooling rates), such as melt-spinning, can produce braze alloys in thin foils. Grinding of braze alloys in cast, ingot, or any other form or atomization technique can be used to make the alloy in powder form. Braze alloys in preform shapes are fabricated by precisely cutting formed and cold-headed wire to ring form or by stamping the alloy strip or foil. Preforms provide an exact volume for the specific region of a particular braze joint. Preforms are placed in a joint region and melt during brazing to join the base materials during cooling into a solid state. In some embodiments, brazing is performed under vacuum or under hydrogen or an inert gas, with the braze temperature typically about at least 20° C. above the liquidus temperature of the braze alloy.

As is apparent from the sophistication of the apparatus, it is also critical that the braze alloys can be positioned and flow into tightly dimensioned spaces to produce the required mechanical and hermetic integrity of the braze joint. In contrast to braze alloys with high STR values, the brazing process can employ a relatively low temperature ramp up as the braze joints of the present disclosure are less prone to liquation.

Braze Alloy Form

The braze alloy is preferably malleable enough to be processed as a standard alloy. It has sufficient workability, i.e., easy to deform into required sizes and shapes via standard metal forming processes such as rolling, wire forming, wire drawing, and stamping.

In one embodiment, the braze alloy may be manufactured into a wire with a diameter of down to 0.030" (760 µm) or down to 0.015" (380 µm). In another embodiment, the braze alloy may to manufactured into a foil with a thickness of down to at least 0.002" (50 µm) or lower. Generally, foils may be produced with a thickness in the range of 0.001" (25 µm) to 0.010" (250 µm) or higher.

Braze Alloy

The braze alloy generally has excellent wettability and flow properties which enable it to make reliable hermetic seals at high temperatures. The braze alloys are particularly suitable for applications in high temperature environments including vacuum tubes (such as x-ray tubes, wave guides and klystrons assemblies).

A braze alloy needs to melt to operate. The melting behaviour is specified by the solidus and liquidus temperature, with the melting onset temperature (the solidus) and the melting range (the difference between the two points) being most significant for brazing. A braze alloy should have a solidus temperature above the maximum temperature it will experience in service, but below the solidus of the lowest melting parent material.

The liquidus temperature of the braze alloy composition is typically below about 1060° C., and typically below 1050° C. The liquidus temperature is typically at least 890° C., or at least 900° C., or at least 950° C. Therefore, the braze alloys are particularly suited for brazing copper or copper alloy substrates. In one embodiment, the braze alloy comprises a liquidus temperature in the range of 950° C. to 1060° C., or in the range of 970° C. to 1050° C. The braze alloy composition is preferably configured to obtain the abovementioned liquidus temperatures or ranges thereof.

Some braze alloys have a narrow melting range and some a wide one. Melting range is often linked to flow and this may drive selection, as may the required heating rate. A braze alloy with a narrow melting range (a small temperature range between the solidus and liquidus) can be used with fast (e.g. greater than 30° C./minute or greater than 40° C./minute from the solidus to the liquidus temperature) or slow heating rates (e.g. in the range of 5° C./minute or 10° C./minute to 30° C./minute from the solidus to the liquidus temperature). A slow heating rate, such as in furnace brazing, for a braze alloy with a wide melting range can result in extensive time where solid and liquid phases are in equilibrium and coexist. This leads to liquation, where the liquid first formed (of a particular composition distinct from the bulk) flows into the joint gap, becoming physically separated from the solid residue. The resulting chemical inhomogeneity can be detrimental to the strength of the joint, and is often aesthetically displeasing.

In some brazing applications the filler metal (i.e. braze alloy) may need to flow to enter the joint gap, but even when preplaced, flow characteristics can still be important in making sure that all of the joint gap is filled. Better flowing alloys can penetrate smaller capillary gaps, but if an alloy is too free-flowing in larger gaps it may fail to be retained in the joint, leading to voids and lower strength. The flow of an alloy is primarily dictated by the relative amounts of solid and liquid present at the brazing temperature. If the alloy melts at a single point (e.g. an eutectic composition or a pure metal) then it will be fully liquid at the brazing temperature and will flow easily. An alloy brazed within its melting range will have some quantity of solid and liquid present; if it is largely molten, it will flow well; if there is a significant solid fraction, the flow will be more sluggish.

Braze Joint Composition

The braze joint composition is configured to comprise a solidification temperature range of no more than 90° C. and a liquidus temperature in the range of 950° C. to 1060° C., whilst comprising no more than 18.0 wt % in total of one of more precious metals selected from Au, Pd and Pt, relative to the total weight of the first braze joint. The braze joint composition may comprise at least 0.1 wt % or at least 0.3 wt % or at least 0.5 wt % or at least 0.8 wt % or at least 1.0 wt % or at least 1.2 wt % of one or more of Pt, Pd, and Au. In some embodiments, the braze joint composition comprises Au.

The target solidification temperature range (e.g. no more than 90° C.) may be obtained with a braze alloy comprising copper and preferably at least 70 wt % Cu or at least 75 wt % Cu or at least 80 wt % Cu or at least 85 wt % Cu.

Germanium has been found to be able to reduce the liquidus temperature of the Cu based alloy without significantly raising the solidification temperature range (STR). The braze joint typically has a Ge amount of no more than 9.0 wt % or no more than 8.0 wt % as Ge amounts above this level may the braze alloy too brittle and difficult to form into the wires, foils or preforms used in the manufacture of the x-ray tube. Ge levels of at least 0.5 wt % or at least 1.0 wt % or at least 2.0 wt % or at least 2.5 wt % may be required to sufficiently reduce the liquidus temperature.

The braze alloy may also comprise other liquidus point suppressants, including Au, Pt, Pd, B, Cr, In, Sn, Si, and Al. Au, Pt and Pd have been particularly advantageously added to the braze joint to moderate the STR values whilst improving joint strength and the wettability of the braze alloy during manufacture.

Levels of B, Cr, In, Sn, Si, Al in the braze joint may need to be limited to a combined amount of no more than 5.0 wt % or no more than 4.0 wt % or no more than 3.0 wt % or no more than 2.5 wt % or no more than 2.0 wt % as the use of these components, as with Germanium, may adversely affect the formability of the braze alloy composition.

In some embodiments the braze alloy composition is free of one or both of boron and tin.

The braze joint may further comprise one or more elements selected from the group consisting of transition metals and rare earth metals not already defined.

In one embodiment, the braze joint comprises Cu, Ge and one or more of Pt, Pd, Au and boron. The braze joint may comprise Cu, Ge and at least 0.5 wt % of the sum of one or more of Au+Pd+Pt and the sum of Cu, Ge and (Pt+Pd+Au) is greater than 90 wt % or greater than 95 wt % or greater than 98 wt % or greater than 99 wt % of the total weight of the braze joint.

In one embodiment the braze joint comprises in weight %:
60≤Cu≤95;
0.5≤Ge≤9.5;
0≤ sum of one or more of Cr, In, Sn, Si, Al≤5.0;
0≤B≤1.25;
0≤ sum of one or more of Au, Pd and Pt<18.0; and
incidental impurities.

In one embodiment the braze joint comprises in weight %:
60≤Cu≤95;
0.5≤Ge≤9.5;
0≤ sum of one more of Cr, In, Sn, Si, Al≤5.0;
one or both of 0<B≤1.25 and 0<sum of one or more of Au, Pd and Pt<18.0;
and
incidental impurities.

In some embodiments, the braze joint comprises at least 0.02 wt % B. In some embodiments, the braze joint comprises at least 0.5 wt % Au.

In some embodiments, the balance of the braze joint comprises transition metals or rare earth metals.

In some embodiments, the amount of Sn in the braze joint is limited to no more than 0.4 wt %. The Sn limitation is particularly preferred when the braze joint composition comprises B, as the combination of these elements has been found to be brittle.

In a further embodiment, the braze joint composition comprises (or consists essentially of) in weight %:
2.0≤Ge≤9.5;
0.02<B≤1.25;
0 to 5.0 additives;
incidental impurities; and
the balance Cu,
wherein the additives and impurities do not comprise Sn in an amount exceeding 0.4 wt % of the total weight of the braze alloy composition.

The additives may comprise or consist of one or more additives selected from the group consisting of transitional and rare earth metals.

The braze alloy composition is preferably suited for use in a vacuum tube and as such as the required properties, including low vapour pressure and low magnetism.

In another embodiment, the braze joint composition comprises in weight %:
54≤Cu≤95.5;
0.5≤Ge≤10.0 and optionally 0 to 5.0 of the sum of Al, Sn, In, Si, and B;
0.5≤ the sum of Au, Pd and Pt≤30.0; and
less than 1.0 incidental impurities.

In another embodiment, the braze joint composition comprises in weight %:
66≤Cu≤95.5;
0.5≤Ge≤10.0 and optionally 0 to 5.0 of the sum of Al, Sn, In, Si, and B;
0.5≤ the sum of Au, Pd and Pt≤18.0; and
less than 1.0 incidental impurities.

In another embodiment, the braze joint composition comprises in weight %:
0.5≤Ge≤10.0 and optionally 0 to 5.0 of a sum of Al, Sn, In, Si, and B;
0.5≤ a sum of Au, Pd and Pt≤30.0;
0 to 5.0 additives selected from the group consisting of transition and rare
earth metal, with the exception of Cu, Au, Pt, Pd and Ni;
less than 1.0 incidental impurities; and
balance Cu.

The braze alloys used to form the braze joints within the high voltage vacuum tubes provide a non-precious metal, or low precious metal content (e.g. <18.0 wt %), alternative for high temperature brazing, particularly in a vacuum environment. The applicants have found that low precious metal braze joints are able to be configured with desirable liquidus temperature; solidification temperature range (STR), with good formability, which is able to form hermetic seals within low pressure environments.

For the purposes of the present disclosure, good formability means that the braze alloy has a formability of at least 38% as determined by the formability test, described herein, and/or the braze alloy is able to be drawn into a wire with a diameter of down to 0.030" (0.76 mm) and preferably down to at least 0.015" (0.38 mm). Typically, wire diameters of up to 0.10" may be used, although larger diameter wires may be manufactured as required.

As disclosed herein, where an element or compound or other constituent is stated to have a content in a numerical range including 0 or a numerical range without a lower limit, the content of this element or compound or other constituent may be zero. In other words, this element or compound or other constituent may be absent, and is therefore optional.

Germanium and Optional Liquidus Temperature Suppressants

Germanium and optional liquidus temperature suppressants amounts of aluminium, tin, indium, silicon, chromium and boron contribute to reducing the liquidus temperature of the braze alloy, whilst maintaining a relatively small solidification temperature range (STR).

In some embodiments, the Germanium content is less than 9.0 wt % or less than 8.0 wt % or less than 7.5 wt % or less than 7.0 wt % or less than 6.8 wt % of the total weight of the braze alloy. The braze alloy composition may comprise at least 0.5 wt % or at least 1.0 wt % or at least 1.5 wt % or at least 2.0 wt % or at least 2.2 wt % or at least 2.5 wt % or at least 2.7 wt % or at least 3.0 wt % or at least 3.5 wt % or at least 4.0 wt % or at least 4.5 wt % Germanium.

In some embodiments, the Germanium content is in the range of 2.5 to 8.0 wt % or 3.0 to 7.5 wt % or 3.5 to 7.0 wt %. This range of Germanium content has been found to obtain targeted liquidus temperature and STR across a wide range of Pt, Pd and Au contents.

In some embodiments, it has been found that for Germanium contents of 2.0 wt % or less or 2.1 wt % or less or 2.2 wt % or less or 2.3 wt % or less or 2.4 wt % or less or 2.5 wt % or less or 3.0 wt % or less or 3.5 wt % or less or 4.0 wt % or less, the liquidus temperature is typically outside a desired targeted range (e.g. less than 1060° C.), unless the sum of Au, Pd and Pt is greater than 10.0 wt % and preferably greater than 11.0 wt % or greater than 12.0 wt % or greater than 13.0 wt %.

The liquidus temperature may be further decreased through the addition of liquidus temperature suppressants, such as aluminium, tin, indium, silicon, chromium and boron. When present (e.g. >0.0 wt %), the boron content may be no more than 1.5 wt % or no more than 1.0 wt % or no more than 0.8 wt % or no more than 0.6 wt % or no more than 0.4 wt % or no more than 0.2 wt % or no more than 0.1 wt %. When present (e.g. >0.0 wt %), the chromium content may be no more than 1.5 wt % or no more than 1.0 wt % or no more than 0.8 wt % or no more than 0.6 wt % or no more than 0.4 wt % or no more than 0.2 wt % or no more than 0.1 wt %. When present, the aluminium content may be no more than 3.0 wt % or no more than 2.0 wt % or no more than 1.0 wt % or no more than 0.8 wt % or no more than 0.6 wt % or no more than 0.5 wt % or no more than 0.4 wt %. When present, the tin content may be no more than 1.5 wt % or no more than 1.0 wt % or no more than 0.8 wt % or no more than 0.6 wt % or no more than 0.4 wt % or no more than 0.2 wt % or no more than 0.1 wt %. When present, the silicon content may be no more than 3.0 wt % or no more than 2.0 wt % or no more than 1.0 wt % or no more than 0.8 wt % or no more than 0.6 wt % or no more than 0.5 wt % or no more than 0.4 wt %. When present, the indium content may be no more than 3.0 wt % or no more than 2.0 wt % or no more than 1.0 wt % or no more than 0.8 wt % or no more than 0.6 wt % or no more than 0.5 wt % or no more than 0.4 wt %. When present, the total amount of Al+Sn+In+Cr+Si+B may be no more than 4.0 wt % or no more than 3.0 wt % or no more than 2.0 wt % or no more than 1.0 wt % or no more than 0.5 wt %. Higher levels of these components may adversely affect one or both of the STR and workability of the resultant braze alloy composition.

Gold, Palladium and Platinum

Relatively small amounts of gold, palladium and platinum contributes to maintaining malleability of the braze alloy, whilst maintaining a small STR.

When present, the gold content or the palladium content or the platinum content is preferably no more than 17 wt % or no more than 16 wt % or no more than 15 wt % or no more than 14 wt % or no more than 13 wt % or no more than 12 wt % or no more than 11 wt % or no more than 10 wt % or no more than 9.0 wt % or no more than 8.0 wt % or no more than 7.0 wt % or no more than 6.0 wt %. The gold content or the palladium content or the platinum content may be at least 0.2 wt % or at least 0.4 wt % or least 0.5 wt % or at least 0.8 wt % or at least 1.0 wt % or least 1.2 wt % or at least 1.5 wt % or at least 1.8 wt % or at least 2.0 wt %.

The total amount of Au, Pd and Pt is preferably no more than 17 wt % or no more than 16 wt % or no more than 15 wt %. or no more than 14 wt % or no more than 13 wt % or no more than 13 wt %. Lower amounts of Au, Pd and Pt may result in poor workability/malleability of the braze alloy. The braze alloys preferably comprises at least 0.8 wt % or at least 1.0 wt % or at least 1.5 wt % or at least 2.0 wt % or at least 2.5 wt % or at least 3.0 wt % or Au, Pd and Pt. In some embodiments, the braze alloy comprises Au and optionally one or both of Pt and Pd. The Pt and Pd may each be in the range of >0 to 10 wt %. in some embodiments, one or both of Pt and Pd is in the range of >0 to 8.0 wt % or 0.1 wt % to 6.0 wt % or 0.2 wt % to 4.0 wt %.

In one embodiment, the braze alloy comprises 0.5 to 18.0 wt % Au and optionally >1.0 to 12.0 wt % and one or both of Pd and Pt in the range of 0 to 10.0 wt % or up to 8.0 wt % or up to 6.0 wt % or up to 4.0 wt %.

In other embodiments, the braze alloy composition comprises no Au and one or both of Pd and Pt.

The braze joint composition is preferably suited for use in a vacuum tube and similar applications due to its properties, including low vapour pressure and low magnetism. The need for low magnetism precludes the use of excess amounts of Ni, Co and Fe. In some embodiments, the combined amounts of Ni, Co and Fe is no more the 4.0 wt % or no more than 3.0 wt % or no more than 2.0 wt % or no more than 1.0 wt %.

Boron Content

The addition of elemental boron (e.g. boron >0.02 wt % or >0.05 wt % or >0.1 wt %) has been shown to result in decreased STR values, whilst boron levels above 1.25 wt % result in braze alloys with insufficient formability, thereby preventing the fabrication of the desired forms of the brazing alloys (e.g. in wire or sheet/foil form).

In some embodiments, the boron level is greater than 0.15 wt % or greater than 0.20 wt % or greater than 0.23 wt %, or greater than 0.25 wt %, or greater than 0.26 wt %, or greater than 0.27 wt %, or greater than 0.28 wt %, or greater than 0.29 wt %, or greater than 0.30 wt %, or greater than 0.31 wt %, or greater than 0.32 wt %, or greater than 0.33 wt %, or greater than 0.34 wt %, or greater than 0.35 wt %, or greater than 0.37 wt %, or greater than 0.39 wt %. In some embodiments, the boron level is no more than 1.2 wt %, or no more than 1.1 wt %, or no more than 1.0 wt %, or no more than 0.90 wt %, or no more than 0.80 wt %, or no more than 0.75 wt %, or no more than 0.70 wt %, or no more than 0.65 wt %, or no more than 0.60 wt %, or no more than 0.55 wt %, or no more than 0.50 wt %.

In a preferred embodiment, the boron content is in the range of greater than 0.27 wt % and no more than 0.80 wt %. Within this range, the braze alloys possess both good formability and low STR values.

Nickel Content

When present the Ni content may be less than 14 wt % or less than 12 wt % or less than 10 wt % or less than 8.0 wt % or less than 6.0 wt % or less than 4.0 wt % or less than 2.0 wt % or less than 1.0 wt %. For some applications, the amount of nickel may be governed by the need for low magnetism.

Additives

Additives exclude elements already defining the composition (for example in some embodiments Cu, Ge, Sn, Al, Si, In, Ni, Au, Pt, Pd and B).

A range of elemental additives (preferably metallic) may be added to the alloy composition to assist the wettability and flowability during the formation of the braze joint and/or the mechanical strength of the resultant braze joint. The additives should be selected as to not significantly adversely affect the STR, liquidus temperature; workability and/or vapour pressure of the braze alloy; or mechanical integrity or hermeticity of the resultant joint.

As would be apparent to the skilled artisan, small amounts of additives may be added to the braze alloy compositions which may enhance or at least not be detrimental to the functionality of the braze alloy composition within a given system or application. The determination of the type and amounts of additives would be within the competency of the skilled artisan, without the need for undue experimentation. The scope of this disclosure covers such additive additions.

In some embodiments, there are greater than 0.0 wt % additives (>0.0 wt %) additives, requiring the alloy composition to include at least some additive content. For example, in some embodiments, the composition includes >0 to 5.0 wt % additives. In some embodiments the additives are selected from the group consisting of transition and rare earth metals, with the exception of Cu, Ni, Au, Pd and Pt. The upper limit of the total and individual additive components will be limited by their ability to maintain the functional performance of the braze alloy, whilst the lower limit will be limited by the amount required to provide a functional benefit to the braze alloy.

The transition and rare earth metal additives may include scandium, titanium, vanadium, chromium, manganese, iron, cobalt, zinc, yttrium, zirconium, niobium, molybdenum, technetium, ruthenium, rhodium, silver, cadmium, lanthanum, hafnium, tantalum, tungsten, rhenium, osmium, iridium, mercury, actinium, rutherfordium, dubnium, seaborgium, bohrium, hassium, meitnerium, darmstadtium, roentgenium, copernicium, cerium, praseodymium, neodymium, promethium, samarium, europium, gadolinium, terbium, dysprosium, holmium, erbium, thulium, ytterbium and lutetium.

In some embodiments the additives comprise >0 to 5 wt % transition metals and preferably at least 0.25 wt % or at least 0.5 wt %.

In some embodiments, the additives may comprise wetting additives selected from the group consisting of Nb, Mo, W, Co, and Fe.

In some embodiments, the additives may comprise Ag or Zn to further enhance workability of the braze alloys.

Ti, V and/or Zr may also be added to assist in the bonding of the braze alloy to ceramic surfaces.

In one embodiment, the additives comprise one or more of Nb, Mo, W, Co, Cr, Fe, Ti, V, Zr, Au, Ag, and Zn.

In some embodiments, the additives comprise 0 or >0 to 3 wt % rare earth metals. The amount of rare earth metals may be no more than 2.0 wt % or no more than 1.0 wt % or no more than 0.5 wt % or no more than 0.1 wt % or no more than 0.05 wt %.

Rare earth metals, such as Nd, Y, Yb and Ce may be added to further improve strength and/or hermeticity through grain refinement.

In one embodiment, the additives comprise one or more of Nb, Mo, W, Co, Cr, Fe, Ti, V, Zr, Au, Ag, Zn, Y, Yb, Nd & Ce.

The additives may comprise metals with a liquidus temperature greater than at least 500° C. or at least 800° C. or at least 900° C. or at least 1000° C. Due to the need for low vapour pressure and high temperature performance, high liquidus temperature additives are preferred.

In some embodiments there is ≤4.0 wt % or ≤3.0 wt % or ≤2.0 wt % or ≤1.0 wt % or ≤0.5 wt % additives. In other embodiments, when present, the additive level may be ≥0.05 wt % or ≥0.10 wt % or ≥0.15 wt % or ≥0.20 wt % additives. Additives levels below this amount may not be sufficient to provide the desired functional effect, such as improved wettability or improved braze joint strength. In some embodiments, the additives comprise or consist of metallic wetting additive(s), which when present, may be selected to improve wettability of the braze alloy on the substrate surfaces being joined (e.g. Nb, Co and/or Fe). Wettability of the braze alloy to the substrate is important to ensure a strong mechanical and hermetic joint. Due to the requirements of the braze alloy to have a low vapour pressure in some applications, additives such as Cd and Zn, are preferably not used.

In one embodiment, each additive has a vapour pressure of no more than $1.0 \times 10^{-7}$ mm Hg ($1.33 \times 10^{-5}$ Pa) at 700° C. and preferably no more than $5 \times 10^{-8}$ mm Hg ($6.65 \times 10^{-6}$ Pa) at 700° C. or no more than $1 \times 10^{-8}$ mm Hg ($1.33 \times 10^{-6}$ Pa) at 700° C. In another embodiment, the addition of the additives (including wetting additives) does not result in the vapour pressure increasing to more than $1.0 \times 10^{-7}$ mm Hg ($1.33 \times 10^{-5}$ Pa) at 700° C. or more than $5 \times 10^{-8}$ mm Hg ($6.65 \times 10^{-6}$ Pa) at 700° C. or more than $1 \times 10^{-8}$ mm Hg ($1.33 \times 10^{-6}$ Pa). These undesirable resultant vapour pressures would typically be a higher vapour pressure than the braze alloy without the addition of the additives. The braze alloy preferable comprises no more than 0.5 wt % or no more than 0.4 wt % or no more than 0.3 wt % or no more than 0.2 wt % or no more than 0.1 wt % or no more than 0.05 wt % of additives that do not meet this requirement.

It will be appreciated that the braze joint composition may be derived from the composition of the braze alloy and the composition of the substrates being joined together, including coatings thereof. At least part, if not all, of the additives in the braze joint composition may be derived through diffusion of components in the substrates being joined into the braze joint.

Incidental Impurities

Incidental impurities as used herein refer to unavoidable traces of elements (including oxidised or reduced forms thereof) which occur during the production process of brazing alloys.

Unless otherwise specified, incidental impurities may include any element or compound which is not already specified within the braze alloy composition. A list of incidental impurities which are typically tested for includes Al, P, Pb, Cd and Zn. For a duplicate analysis of Example 14 (Table 1), all of the incidental impurities were measured to be less than the detection limit (% wt) being Al<0.001; P<0.002; Pb<0.001; Cd<0.001; and Zn<0.001. Whilst Cd and Zn are transition metals, for the application the braze alloy is to be used for (e.g. x-ray tubes), Cd and Zn are considered an incidental impurity. The applicant's use of ultrapure raw materials is not reflective of the typical incidental impurity levels of these selected components.

The upper limit of the total amount of impurities may be 1.0 wt. %, preferably 0.5 wt. %, and more preferably 0.15 wt. %. These small quantities of elements typically do not contribute to or modify the actual purpose and/or performance of the brazing alloy. In one embodiment, the incidental impurities comprise no more than 0.5 wt % or no more than 0.2 wt % or no more than 0.15 wt % or no more than 0.1 wt % or no more than 0.05 wt % of any one impurity element (e.g. C or P).

While incidental impurities (also known as unavoidable impurities) may vary depending upon the purity of the raw material used, typical levels of incidental impurities are less than 0.8 wt % or less than 0.5 wt % or less than 0.2 wt % or less than 0.1 wt % or less than 0.05 wt % of the total weight of the braze alloy composition. Some applications required even stricter limits. For example, limits for each of Zn, Cd, Pb, C may be less than 0.1 wt % or less than 0.05 wt % or less than 0.01 wt % or less than 0.005 wt % or less than 0.01 wt % of the total weight of the braze alloy composition. In one embodiment, Zn and Cd have limits of less than 0.002 wt % or less than 0.001 wt %. Pb and P may have a limit of less than 0.01 wt % or less than 0.002 wt %. C may have a limit of less than 0.05 wt % or less than 0.01 wt % of the total weight of the braze alloy composition. All other metallic impurities having a vapour pressure higher than $10^{-7}$ mm Hg ($1.33 \times 10^{-5}$ Pa) at 500° C. are preferably limited to 0.1 wt % or less than or 0.01 wt % or less; or 0.005 wt % or less or 0.002 wt % or less each. Impurities having a vapour pressure lower than $10^{-7}$ mm Hg at 500° C. are preferably limited to a total no more than 0.2 wt % or no more than 0.1 wt % or no more than of 0.075 wt % of the total weight of the braze alloy composition.

Substrates

The high voltage tubes of the present disclosure may comprise a variety of substrates suitable for being joined and/or sealed using the previously defined low precious metal braze alloy. The high voltage vacuum tube may comprise brazed assembling comprising substrates including, but are not limited to, substrates comprising copper or copper alloys, Kovar (Ni—Co—Fe alloy), ceramics components that have been metallised (e.g. molybdenum-manganese metallised or nickel or copper plating); steel, including stainless steel; nickel and nickel alloys including Ni-super alloys, and other refractory metals (e.g. molybdenum and alloys thereof) comprising a liquidus temperature preferably at least 20° C. or at least 35° C. or at least 50° C. above the liquidus temperature of the braze alloy.

Solidus Temperature Range

To avoid liquation in the high voltage vacuum tube braze joints while promoting good braze coverage over the joint, the braze alloy used to produce the brazed joint preferably possesses a narrow temperature difference between the solidus temperature and the liquidus temperature (i.e. low STR values). In some embodiments, the braze joint composition is configured to obtain the temperature difference between the solidus temperature and the liquidus temperature of the braze alloy of no more than 90° C., or no more than 88° C., or no more than 85° C., or no more than 82° C., or no more than 80° C., or no more than 75° C., or no more than 70° C., or no more than 65° C., or no more than 60° C., or no more than 55° C., or no more than 50° C., or no more than 45° C., or no more than 40° C., or no more than 35° C., or no more than 30° C., or no more than 25° C., or no more than 20° C. The abovementioned STR ranges are considered to be low STR values.

In a third second of the present disclosure there is provided a high voltage vacuum tube braze assembly comprising a first joint and a second joint wherein at least one of the joints comprises a composition as previously described in the braze joint composition section.

In one embodiment, the assembly comprises two joints with each joint comprising a composition according to the first aspect of the present disclosure. Each of the braze alloys may be different. The first joint may comprise a composition comprising a liquidus temperature below the solidus temperature of the second braze joint composition.

In one embodiment, the first and second braze joints comprise a composition according to the first aspect of the present disclosure. Preferably the difference between the solidus temperature of the first joint and the liquidus temperature of the second joint is at least +15° C., or at least +20° C. The first joint may comprise a braze alloy composition with a solidus temperature of at least 950° C., or at least 990° C., and the second joint comprises a liquidus temperature of no more than 980° C.

This type of assembly is ideally suited to a step brazing process in which the higher temperature braze joint is first assembled and cooled before the lower temperature second braze joint is assembled. As the solidus temperature of the first braze joint is higher than the liquidus temperature of the second braze joint, the integrity of the first braze joint should not be compromised if the brazing temperature of the second braze joint is kept below the solidus temperature of the brazing alloy of the first braze joint.

Whilst the present disclosure encompasses step brazing using two braze alloy compositions, the present disclosure also encompasses step brazing wherein only one of the braze joints comprise a braze alloy according to the first aspect of the present disclosure.

In some embodiments, the brazing process may result in the migration of boron from the braze joint. The reduction of the boron content in this first braze joint may result in an increase of the solidus & liquidus temperature compared to original braze alloy composition, thereby enabling the same braze alloy composition to be used in a step brazing operation. This rise in liquidus temperature may enable the same original braze alloy to be used to subsequently braze an adjacent component (second braze joint), with the brazing temperature being below the solidus temperature of the first braze joint.

The braze joint may also comprise compositional variations compared to the braze alloy composition used to form the braze joint. In some embodiments, the braze joints are derivable from the braze alloy composition of the first aspect of the present disclosure. The derivable braze joints may have a lower boron content compared to the braze alloy composition from which it is derived. The adjacent materials/components to the braze joint may also have an evaluated level of boron relative to the materials/components prior to the braze joint being formed.

Brazing, as used herein, refers to a joining process of two (or more) materials to be joined using a brazing alloy which blends with the materials to be joined upon melting. The liquidus temperature of the brazing alloy is lower than the liquidus temperature of the materials to be joined. The liquefied/molten brazing alloy interacts with the materials to be joined and forms the braze joint during cooling. The interaction of the braze alloy and the materials to be joined can be described by diffusion processes and formation processes of intermetallic phases and other compounds. The brazing may be performed in a vacuum, reducing or protective atmosphere (e.g. mixtures of hydrogen and nitrogen gases). A flux may be used during brazing in order to remove oxides from the brazing surfaces of the materials to be joined and to prevent the formation of oxides during brazing, thereby allowing a thorough wetting of the surfaces of the materials to be joined by the liquefied/molten brazing alloy. However, a fluxless braze is preferred.

High voltage vacuum tubes comprise an anode and a cathode, which are disposed opposite one another in a vacuumized inner space. The vacuumized inner space is typically enclosed by a cylindrical metal housing, with the anode and/or cathode being electrically insulated by means of an annular insulator. The high voltage vacuum tubes may have an operating temperature above 800° C., or above 900° C., or above 950° C., or above 1000° C.

Process

In a third aspect of the present disclosure there is provided an a process of producing a high voltage vacuum tube of the first aspect of the disclosure, wherein the braze assembly is formed the first component; the second component and a braze alloy composition comprising no more than 18.0 wt % in total of one of more precious metals selected from Au, Pd and Pt and configured to comprise a solidification temperature range of no more than 90° C. and a liquidus temperature in the range of 950° C. to 1060° C., wherein the braze assembly is formed by:

a. optionally holding the braze assembly at a temperature between 10° C. and 400° C. below the liquidus temperature of the braze alloy composition for at least 10 minutes;

b. heating the braze assembly to a brazing temperature above the liquidus temperature of the braze alloy composition; and c. cooling the braze assembly below the solidus temperature of the braze alloy composition to form the braze joint joining the first component and the second component together.

The process includes ramping the temperature between the solidus and the liquidus temperature at a rate of 1° C./min to 30° C./min between the solidus and the liquidus temperature of said braze alloy. The temperature ramp rate may be less than 28° C./min, or less than 26° C./min, or less than 24° C./min, or less than 22° C./min, or less than 20° C./min, or less than 18° C./min, or less than 16° C./min, or less than 14° C./min, or less than 12° C./min. In contrast to braze alloys with a high STR, the braze alloys of the present disclosure are able to be brazed at a lower rate of heating without the same risk of liquidation resulting in poor joint performance. The use of lower heating rates also avoids other disadvantages associated with faster heating rates such as component distortion, spalling, and excessive outgassing. This enables the braze alloys to be effectively used in a greater array of brazing environments, including the brazing of components in which one component has a low conductivity (e.g. a ceramic) and/or a large thermal mass such that fast heating rates are difficult to achieve.

In some embodiments, the braze cycle also includes holding the braze joint and associated substrates at a temperature of typically between 10° C. and 400° C. below the solidus temperature for between 10 and 30 minutes prior to brazing the braze joint at the brazing temperature, typically between 15° C. and 60° C. above the liquidus temperature of the braze alloy.

In other embodiments, the double braze is used, in which the braze joint is cooled approximately 100° C. (to below the solidus temperature) between braze cycles.

The brazed joint may be formed in a brazing furnace including a vacuum, reducing (e.g. $H_2$) or protective (e.g. $N_2$ or Argon) furnace. The brazing of blind joints is particularly suited to being formed in a brazing furnace or oven, as the temperature and atmospheric conditions of brazing can be reliably controlled. The vacuum furnace may have an evacuated vacuum of less than $8\times10^{-4}$ mmHg ($1.17\times10^{-3}$ Pa) and preferably less than $5\times10^{-4}$ mmHg ($6.65\times10^{-2}$ Pa). The use of laser brazing in a controlled atmosphere may also be able to achieve the required levels of temperature and atmospheric control.

In some embodiments, a two-step brazing process is employed comprising brazing a first braze alloy composition to a first brazing temperature and allowing to cool to form a first braze joint and then brazing a second braze alloy composition to a second brazing temperature and allowing to cool to form a second braze joint, wherein the solidus temperature of the first braze joint is higher than the liquidus temperature of the second braze joint, wherein the second brazing temperature is kept below the solidus temperature of the first braze joint. (e.g. by at least 10° C. or at least 15° C. or at least 20° C.).

In one embodiment, the braze joint is form through placing the braze alloy composition in the form of a wire, powder, paste or foil adjacent two components to be joined and heating the braze composition above the liquidus temperature of the braze alloy composition and allowing a molten braze alloy to flow between the two components via capillary action to form the braze joint.

Braze Joint Performance

The braze alloys and derived joints of the present disclosure are preferably hermetic, have good mechanical strength and have a low vapour pressure.

The braze joints of the present disclosure preferably have a hermeticity with a maximum permissible leakage rate of closed vacuum assemblies of $1\times10^{-6}$ atm·cc/s or less, $1\times10^{-7}$ atm·cc/s or less, or $1\times10^{-8}$ atm·cc/s or less (ASTM F2391 using helium gas). In some applications, such as RTP assemblies, lower seal integrity may be sufficient, although braze joint integrity should be such that the process gases are contained within the process chamber and do not leak through the braze joint.

The braze joints of the present disclosure preferably have a tensile strength of at least 900 MPa or at least 950 MPa or at least 1000 MPa. The braze joints of the present disclosure preferably have a shear strength of at least 5.0 or at least 7.0 MPa. The tensile and shear strength is measured in accordance with AWS C.3.2M/C3.2:2019 Standard method for evaluating the strength of braze joints. The reference substrates for testing was joining 304 stainless steel to 100% copper.

The braze alloy of the present disclosure preferably has a vapour pressure less than $1\times10^{-11}$ mm Hg at 500° C. ($1.33\times10^{-9}$ Pa), or less than $1\times10^{-12}$ mm Hg ($1.33\times10^{-10}$ Pa) at 500° C., or less than $1\times10^{-13}$ mm Hg ($1.33\times10^{-11}$ Pa) at 500° C., or less than $5\times10^{-14}$ mm Hg ($1.33\times10^{-12}$ Pa) at 500° C., or less than $1\times10^{-15}$ mm Hg ($1.33\times10^{-13}$ Pa) at 500° C. At 700° C., the vapour pressure of the braze alloy is preferably less than $1\times10^{-8}$ mm Hg ($1.33\times10^{-6}$ Pa), or less than $1\times10^{-9}$ mm Hg ($1.33\times10^{-7}$ Pa), or less than $5\times10^{-10}$ mm Hg ($1.33\times10^{-8}$ Pa), or less than $1\times10^{-11}$ mm Hg ($1.33\times10^{-9}$ Pa).

A solidus temperature is the highest temperature at which a metal; or alloy is completely solid. A liquidus temperature is the lowest temperature at which a metal or alloy is completely liquid.

High voltage, for the purposes of the present disclosure means a voltage of at least 1 kV or at least 10 kV or at least 100 kV. The benefits of the braze alloy of the present disclosure may also be governed by applications where the Voltage/distance (V/d) ratio is sufficiently high, for example at least 0.5 kV/mm or at least 1 kV/mm or at least 10 kV/mm.

Vacuum brazing is typically performed at about $1\times10^{-5}$ mm Hg ($1.33\times10^{-3}$ Pa).

Workability and formability are terms which are interchangeably used.

The notation of "Balance Cu" means that the copper makes up the remaining portion of the braze alloy composition up to 100.00 wt %. (i.e. % wt copper=100.00 wt %–amount of all the other components (wt %) in the braze alloy).

The sum of all of the components of the braze alloy shall not exceed 100 wt %. Theoretical sums of combinations of components exceeding 100 wt % should be disregarded.

Unless otherwise indicated references to % wt amounts are on the basis of the total weight of the braze alloy composition.

Precious metals for the purposes of the present disclosure means gold, silver, and palladium and platinum.

Reference to the components of a composition are reference to these components in their elemental form (i.e. oxidation number=0). Incidental impurities may be in any permitted oxidation state, but preferably have an oxidation number of zero.

EXAMPLES

Sample braze alloys in various compositions listed in Table 1 were prepared via heating the mixture of elemental components to about 1080° C. to form a homogeneous melt. The molten alloy was then cast into the form of an ingot, followed by cold working and annealing to produce the alloy in a wire and/or foil form.

Methodology

Solidus and Liquidus Temperature

The Differential Scanning calorimetry (DSC) depicted the melting behaviour of these alloys. The liquidus and solidus temperatures were measured by DSC, using small samples of ~20 mg mass placed in an alumina crucible with a lid. After loading the sample, the chamber was evacuated and backfilled with argon gas. The analysis was carried out in the temperature range from 298 K to 1373 K at a heating rate of 20 K min$^{-1}$.

The output of the analysis is a curve representing the variation of heat flux with the temperature.

Figure 2:
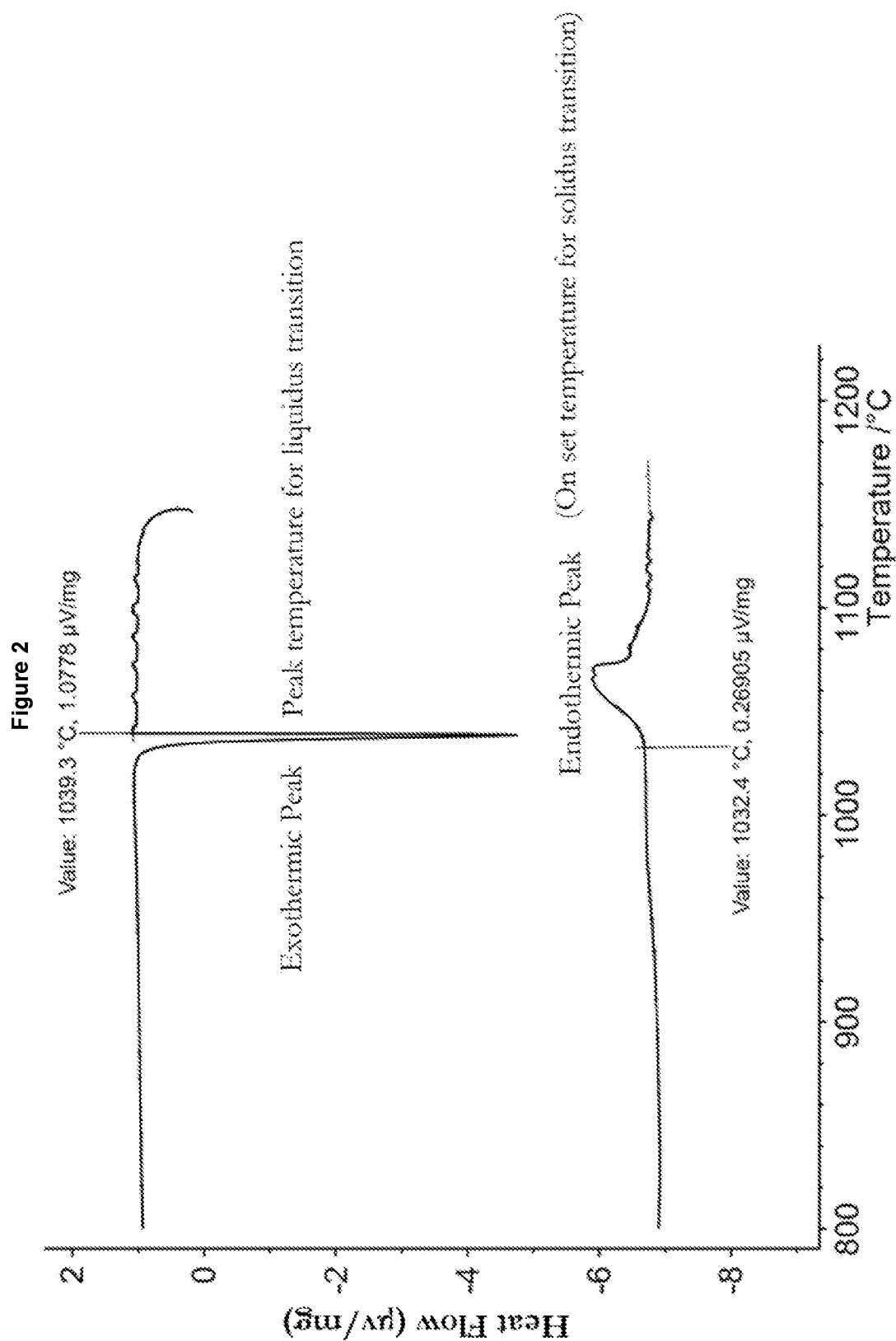
FIG. 2 is a differential scanning calorimetry (DSC) scan of Sample 4 in accordance with the present disclosure.
Figure 3:
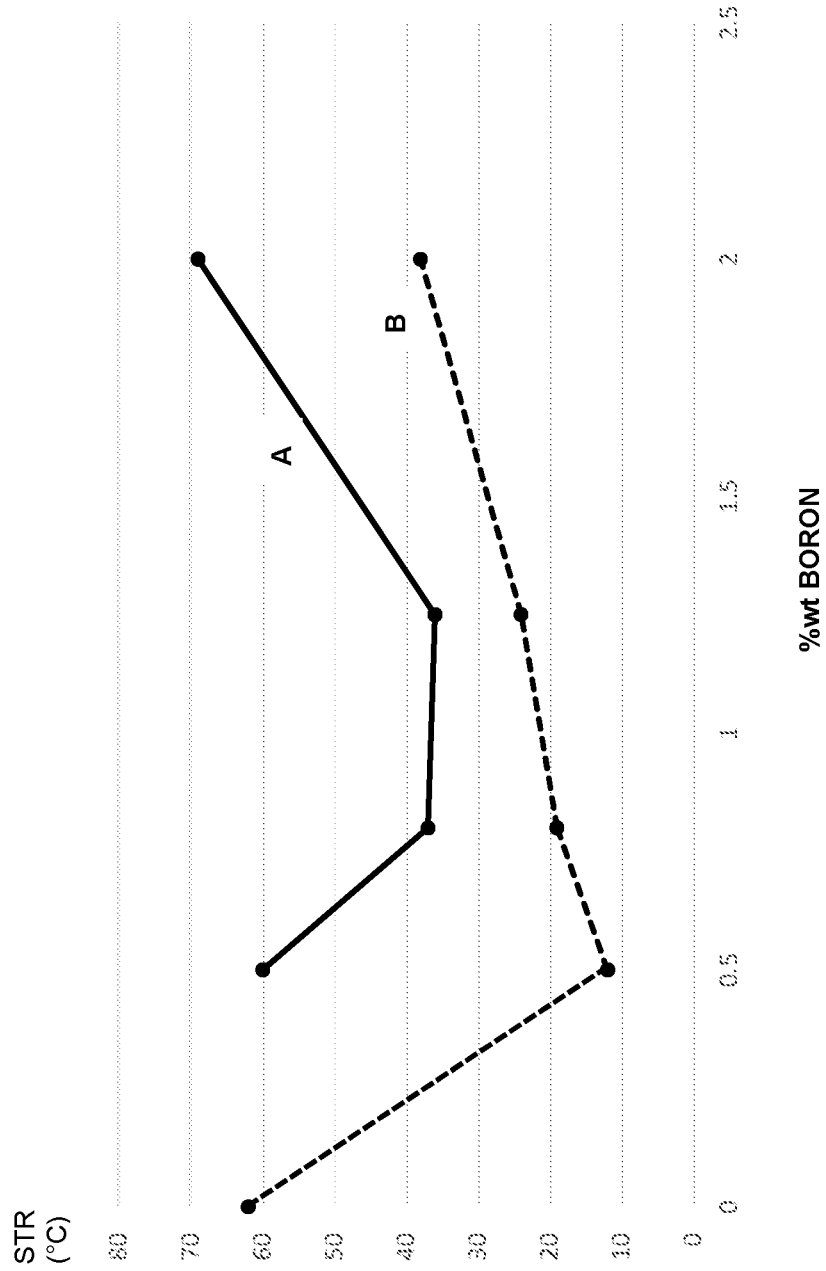
FIG. 3 is a graph illustrating the influence of boron content in the braze alloy on the solidus liquidus temperature range in accordance with the present disclosure.

With reference to FIG. 2, the DSC measures physical and chemical changes within a material in response to temperature. It provides information about endothermic (absorbs heat), exothermic (releases heat), and changes in heat capacity.

DSC experimentation (measured using a Netzch DSC instrument—model Jupiter STA 449 F3) involves two stages: heating and cooling and the same cycle again for a second time (second cycle of heating and cooling). FIG. 2 is the DSC curve for the $2^{nd}$ heating cooling cycle for sample 4. For better visibility the DSC curve (which is continuous) has been separated with the bottom curve the heating curve (left to right) and the top curve being the cooling curve (right to left). The solidus temperature of 1032.4° C. is determined at the point on the heating curve immediately before an increase in heat flux, indicating the start of the formation of a liquid phase. The liquidus temperature of 1039.3° C. is determined at the point on the cooling curve immediately before a decrease in heat flux, indicating the start of the formation of a solid phase.

Formability

The compositions of the alloy were prepared by melting 5±1 grams (0.25 inch in height) on a water-cooled copper hearth using a tungsten electrode in an argon gas atmosphere, producing semi-spherical alloy ingots (buttons). Buttons of different compositions were subjected to cold rolling to test their ability to plastically deform into sheet form using a two-roll mill.

The formability of each composition was determined by measuring the deformation required to cause a fracture when passed through the rolls at room temperature. In each step, the roll gap is adjusted to the equivalent of up to a 10% reduction in the thickness of the button. The formability of alloys that can withstand cold rolling down to a 0.002 inch (≈50 μm) thick sheet is considered near ductile. The formability test defines a reduction from 0.25" to 0.002" to correspond to 100% formability, with a reduction to 0.125" corresponding to 50% formability.

Figure 6B:
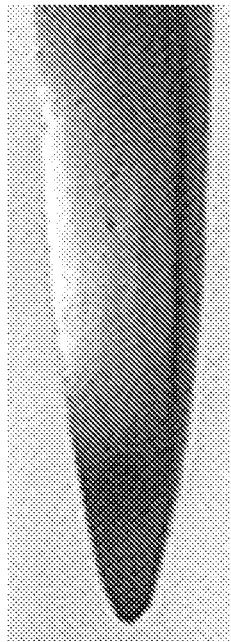
FIGS. 6A-6F are photographs illustrating the formability of samples 8 to 12; and C-6 respectively, in accordance with the present disclosure.
Figure 6D:
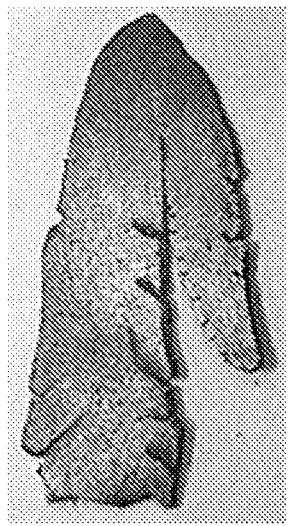

The compositions were considered somewhat brittle in nature if there was an early onset of fracture before reaching the target thickness of about 50 μm. This methodology was used to assess the ability of the various compositions of this alloy to fabricate braze filler metal wire or sheet pre-made forms. The early onset of fracture means the visible appearance of factures by the naked eye in the sample, as observed in FIGS. 6d (60% formability), 6e (38% formability) and 6f (20% formability) compared to FIGS. 6a-c which exhibit no visible signs of fractures when the samples are processed to a thickness of 50 μm (100% formability).

Formability percentages of at least 38% are considered feasible to fabricate into braze alloy pre-forms, although formability of at least 45% or at least 50% or at least 60% or at least 70% or at least 80% or at least 90% or 100% are preferred. Accordingly, the boron content of the braze alloy composition may be configured to obtain the abovementioned formability values or value ranges.

Shear Strength

The shear strength is measured in accordance with AWS C.3.2M/C3.2:2019 Standard method for evaluating the strength of braze joints. The shear strength was measured between 304 stainless steel and pure copper substrates. It was observed that for each of the shear strength tests, the failure point of at the copper substrate, indicating that the increase in the reported shear strength may be due to the diffusion of braze joint elements of the present disclosure into the copper substrate, thereby strengthening the copper substrate.

Hermeticity

The hermeticity of the brazed joint was tested in accordance with ASTM F2391 using helium gas. Hermicity testing was carried out on all samples which were tested for Shear Strength, with all sample under the scope of the disclosure passing the test through achieving a permissible He leakage rate of 1×10$^{-8}$ atm·cc/s or less.

Experimental Results

A series of experiments were conducted to assess the characteristics of the braze alloys in terms of their solidus(S) and liquidus (L) temperature as well as their formability.

The vapour pressures of the braze alloys of the present disclosure in Table 1 were found to be less than 1×10$^{-11}$ mm Hg (1.33×10$^{-9}$ Pa). The vapor pressure of each alloy is estimated using each elements individual vapor pressure contribution:

$$Ptot = \sum aiPi \; (i = 1 \text{ to } n) \quad \text{(Equation 1)}$$

where ai is the activity and Pi is the equilibrium vapor pressure at the Liquidus +50° C. temperature.

The preferential vaporization of different alloying elements is a function of the element's volatility and the element's activity within an alloy. The partial contribution of each alloy element to the total equilibrium vapor pressure is a function of the pure element's equilibrium vapor pressure and its activity in the alloy, as described by Equation (1).

We reference to FIG. 2, the effect of boron on braze alloys with 2.5 wt % Germanium (line A) and 4.8 wt % Germanium (line B) demonstrates that for each there is an optimum boron content which results in a minimum STR value. For Germanium contents of 2.5 wt % (samples 1, 2, 3, C-1), 4.2 wt % (sample 4); and 4.8 wt % (samples C-2, C-3, 5, 6, 7), the optimum boron content ranged from about 0.5 to 1.25 wt % boron. While a similar decline in STR was observed at Germanium levels at 7.2 wt % (a minimum STR recorded at 0.55 wt % boron) and 10 wt % (a minimum STR recorded at 0.80 wt % boron), the absolute minimum STR values were not as low compared to the lower Ge content brazing alloys.

However, a limitation of low Ge contents is that they have elevated liquidus temperatures, which may be detrimental to applications involving the brazing of copper or copper alloy components. Braze alloys with a Ge content of about 4.2 wt % to 4.8 wt % of the present disclosure were found to have an excellent combination of low STR values; liquidus temperatures in the target range of brazing copper/copper alloy components; and good formability. The braze alloy compositions of the present disclosure provide a variety of liquidus temperatures, favourable STR ranges and acceptable formability to meet the functional requirements of a many end-uses applications, all without the use of any substantial amounts of precious metals.

For example, the melting profile of sample 4 is similar to the precious metal braze alloy 35Au-65Cu (WESGO™), with the latter have a liquidus temperature of 1010° C. and a STR of 20° C. (Table 2). Whilst other samples may have higher STRs than precious metal braze alloy alternatives, they still offer improved performance relative to existing non-precious metal alternatives. For example, 50Au-50Cu (WESGO™) has a liquidus temperature of 970 and a STR of 15° C. (Table 2). Samples 15 and 16 have a comparable liquidus temperature, but a STR of 68-69° C. This is a significant improvement on the non-precious metal braze alloy (GEMCO™ by WESGOT) which comprises a liquidus temperature of 975° C., but a STR of 95° C. (Table 2).

Whilst higher Ge content braze alloys (e.g. 7.2 wt % or above) may have relatively high STR levels and lower liquidus temperatures (compared to braze alloys with lower levels of Ge), these braze alloy characteristics are still acceptable for some applications.

As indicated in Table 1, the formability of the braze alloys tended to decrease with an increase in boron content, with formability noticeably decreasing as boron content increases above 1.0 wt %. The Ge content appears to have a lesser impact on the formability, with the formability dropping from 43 to 40 to 38 as the Ge content increased from 2.5 wt % to 4.8 wt % to 7.2 wt % respectively, at a constant boron content of 1.25 wt %. FIG. 6A to 6F illustrate the foils formed in samples 8 to 12; and C-6, with samples 11, 12 and C-6 showing visible signs of cracking as formability decreases.

Effect of Au, Pd, Pt Addition

As illustrated in Samples 22, 24 to 41, the addition of Au, Pd and Pt provides braze alloy compositions with desirably low STRs and liquidus temperatures in the target range for brazing the internal side of the x-ray tube, exposed to high temperatures, vacuum and in some instances high stress. In comparison conventional braze alloys such as 50 Au 50 Cu with a shear strength of 1279 PSI, the braze joints comprising Au have improved shear strength and thus are particularly advantageously used in rotating anode assemblies within the x-ray tube.

TABLE 1

| ID | Cu (wt %) | Ge (wt %) | B (wt %) | Other (wt %) | L Temp (° C.) | S Temp (° C.) | STR Temp (° C.) | Form. % | Shear (PSI) |
|---|---|---|---|---|---|---|---|---|---|
| 1 | 96.75 | 2.5 | 0.5 | 0.25 Ni | 1068 | 1008 | 60 | 100 | — |
| 2 | 96.45 | 2.5 | 0.8 | 0.25 Ni | 1039 | 1002 | 37 | 68 | — |
| 3 | 96.0 | 2.5 | 1.25 | 0.25 Ni | 1044 | 1008 | 36 | 43 | — |
| C-1 | 95.25 | 2.5 | 2.0 | 0.25 Ni | 1077 | 1008 | 69 | 36 | — |
| 4 | 94.81 | 4.2 | 0.84 | 0.15 Ni | 1039 | 1032 | 7 | 84 | — |
| C-2 | 94.95 | 4.8 | 0 | 0.25 Ni | 1048 | 986 | 62 | 100 | — |
| 5 | 94.45 | 4.8 | 0.5 | 0.25 Ni | 1015 | 1003 | 12 | 100 | — |
| 6 | 94.18 | 4.8 | 0.77 | 0.25 Ni | 1035 | 1016 | 19 | 83 | — |
| 7 | 93.7 | 4.8 | 1.25 | 0.25 Ni | 1010 | 986 | 24 | 40 | — |
| C-3 | 92.95 | 4.8 | 2.0 | 0.25 Ni | 989 | 951 | 38 | 35 | — |
| 8 | 92.3 | 7.2 | 0.25 | 0.25 Ni | 1035 | 959 | 76 | 100 | — |
| 9 | 92.175 | 7.2 | 0.375 | 0.25 Ni | 1034 | 959 | 75 | 100 | — |
| 10 | 92.0 | 7.2 | 0.55 | 0.25 Ni | 1020 | 954 | 66 | 100 | — |
| 11 | 91.75 | 7.2 | 0.8 | 0.25 Ni | 1040 | 962 | 78 | 60 | — |
| 12 | 91.30 | 7.2 | 1.25 | 0.25 Ni | 1012 | 953 | 59 | 38 | — |
| 13 | 91.94 | 7.33 | 0.47 | 0.26 Ni | 1028 | 947 | 81 | — | — |
| 14 | 91.82 | 7.4 | 0.53 | 0.25 Ni | 1005 | 967 | 38 | 100 | 1041 |
| C-4 | 89.75 | 10 | 0 | 0.25 Ni | 1005 | 902 | 103 | 100 | — |
| 15 | 89.25 | 10 | 0.5 | 0.25 Ni | 974 | 905 | 69 | 100 | — |
| 16 | 88.95 | 10 | 0.8 | 0.25 Ni | 974 | 906 | 68 | 56 | — |
| 17 | 93.00 | 6.5 | 0.25 | 0.25 Ni | 1025 | 956 | 69 | 100 | — |
| C-5 | 87.25 | 12 | 0.5 | 0.25 Ni | 968 | 823 | 145 | 100 | 1299 |
| C-6 | 93.45 | 4.8 | 0.5 | 1.0 Sn 0.25 Ni | 1010 | 837 | 173 | 20 | — |
| C-7 | 92.00 | 6.5 | 0.25 | 1.0 Sn 0.25 Ni | 1007 | 891 | 116 | 30 | — |
| C-8 | 88.90 | 10 | 0.1 | 1.0 Sn | 983 | 773 | 210 | — | — |
| 18 | 90.55 | 5.5 | 0.7 | 3.0 Co 0.25 Ni | 1053 | 1003 | 50 | — | — |
| 19 | 87.60 | 7.5 | 0.1 | 4.8 Ni | 1026 | 937 | 89 | — | — |
| 20 | 91.25 | 5.5 | 0.8 | 2.2 Fe 0.25 Ni | 1059 | 1019 | 40 | — | — |
| 21 | 92.55 | 5.5 | 0.7 | 1.0 Ag 0.25 Ni | 1012 | 970 | 42 | — | — |
| 22 | 90.75 | 4.5 | 0.7 | 3.8 Au | 1037 | 998 | 39 | — | — |
| 23 | 95.50 | 4.0 | 0.5 | 0.45 Si 0.2 Al 0.25 Ni | 1007 | 920 | 87 | — | — |
| 24 | 92.30 | 6.7 | 0 | 1.0 Au | 1032 | 989 | 43 | 100 | 1628 |
| 25 | 89.40 | 5.3 | 0 | 5.3 Au | 1049 | 1047 | 2 | 100 | — |
| 26 | 92.00 | 6.5 | 0.5 | 1.0 Au | 1038 | 969 | 65 | — | — |
| 27 | 86.50 | 3.0 | 0.5 | 10 Au | 1039 | 984 | 55 | 75 | — |
| 28 | 86.50 | 3.0 | 0 | 10 Au 0.5 Si | 1057 | 1036 | 21 | 96 | — |
| 29 | 86.5 | 3.0 | 0.5 | 10.0 Au | 1007 | 969 | 38 | 75 | — |

TABLE 1-continued

| ID | Cu (wt %) | Ge (wt %) | B (wt %) | Other (wt %) | L Temp (° C.) | S Temp (° C.) | STR Temp (° C.) | Form. % | Shear (PSI) |
|---|---|---|---|---|---|---|---|---|---|
| 30 | 89.5 | 2.5 | 1.0 | 7.0 Au | 1015 | 985 | 30 | 68 | — |
| 31 | 92.0 | 8.0 | 0 | 10.0 Au | 1020 | 935 | 85 | 85 | — |
| 32 | 90.6 | 6.7 | 0 | 2.7 Au | 1044 | 1013 | 31 | 100 | 1383 |
| 33 | 76.0 | 4.0 | 0 | 20.0 Au | 1032 | 1002 | 30 | 100 | 1341 |
| 34 | 74.0 | 6.0 | 0 | 20.0 Au | 978 | 927 | 51 | — | 1363 |
| 35 | 84.0 | 2.0 | 0 | 14.0 Au | 1056 | 1031 | 25 | — | 1345 |
| 36 | 78.6 | 2.7 | 0 | 18.7 Au | 1012 | 1004 | 8 | — | — |
| 37 | 84.0 | 6.0 | 0 | 10.0 Au | 1064 | 1041 | 23 | 100 | — |
| 38 | 80.0 | 10.0 | 0 | 10.0 Au | 950 | 850 | 100 | 50 | — |
| 39 | 72.0 | 2.0 | 0 | 25.0 Au 1.0 Sn | 993 | 963 | 30 | 97 | — |
| 40 | 85.0 | 4.0 | 0 | 10 Au 1.0 Ni | 1028 | 1025 | 3 | 97 | — |
| 41 | 90.0 | 6.0 | 0 | 4.0 Pt 4.0 Pd | 1023 | 1008 | 15 | 97 | — |
| C-9 | 81.5 | 8.5 | 1.0 | 9.0 Ni | 1026 | 926 | 100 | — | — |
| C-10 | 91.45 | 2.5 | 0.8 | 5.0 Y 0.25 Ni | 1077 | 983 | 94 | — | — |
| C-11 | 85.8 | 5.5 | 0.8 | 8.0 Ag 0.70 Ni | 1006 | 775 | 231 | — | — |
| C-12 | 46.0 | 6.0 | 0 | 48.0 Pd | 1088 | 1059 | 29 | 21 | — |

Figure 9:
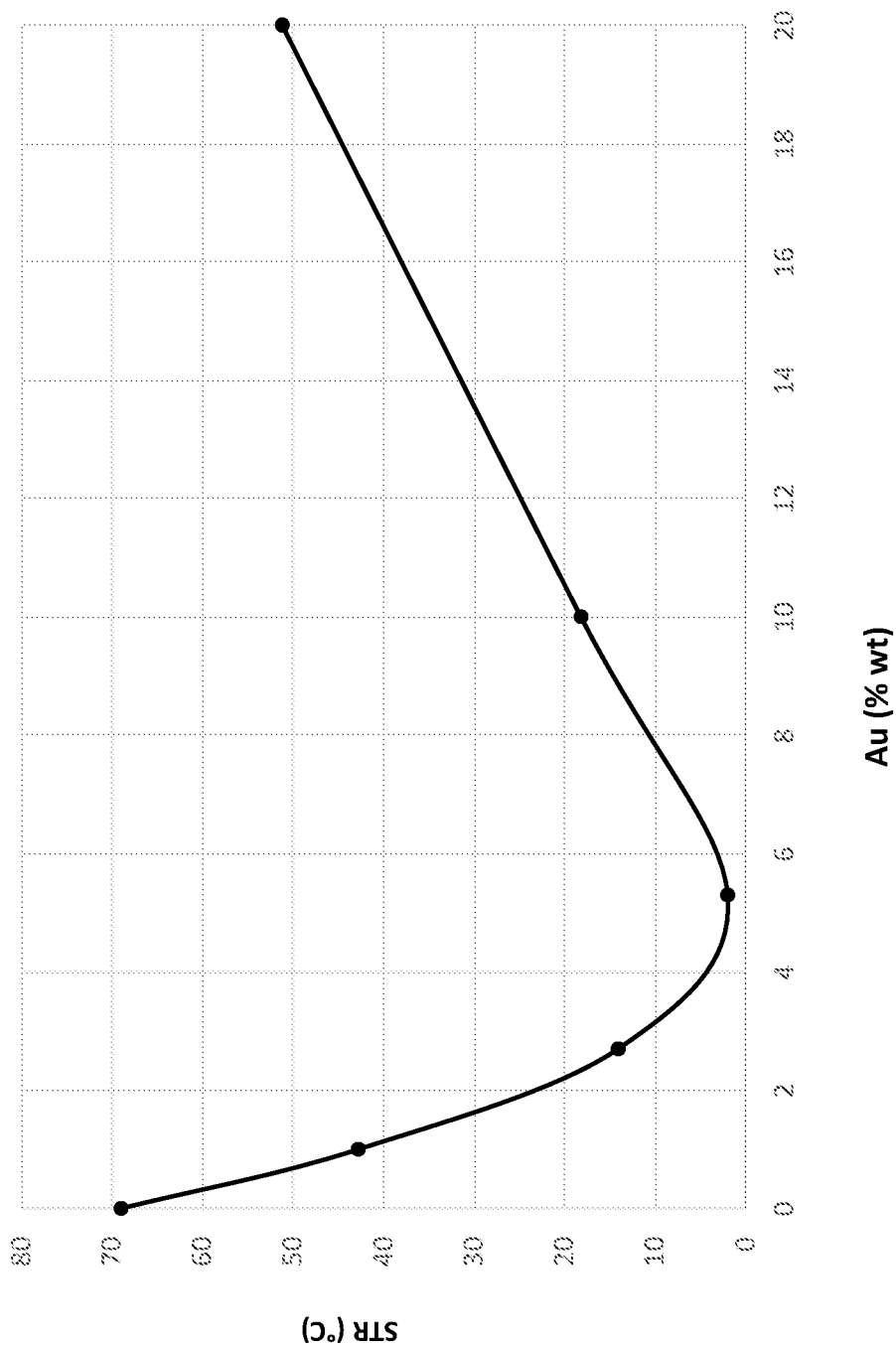
FIG. 9 is a graph illustrating the Solidification Temperature Range (STR) versus the Au content of the braze alloys in accordance with the present disclosure.

As illustrated in FIG. 9, the additional of a relatively small amount of Au to a Cu—Ge alloy containing about 6 wt % (5.3 to 6.5 wt %) Ge results in a significant decrease in the STR of the resultant braze alloy composition. An almost eutectic composition was obtained at an Au content of 5.3 wt % after which a further increase in Au content results in a gradual increase in the STR. Example 41 containing 4 wt % each of Pd and Pt (8 wt % combined) and 6 wt % Ge achieves an STR of 15° C. which is consistent with the STR value of an equivalent composition comprising 8 wt % Au (rather than 4 wt % each of Pd and Pt), when the STR is estimated through interpolation of the data in FIG. 9. This result supports the notation that Pd and Pt have a similar effect on the STR as Au, with each of AU, Pt and Pd unexpectedly able to provide high quality braze joints when present in relatively small amounts.

With reference to FIG. 10, the variation in liquidus and solidus temperatures with Ge concentration at a fixed Au concentration of 10 wt % highlights that at that Au concentration, the optimum Ge concentration is between about 2.5 wt % to about 7.0 wt %, with particularly low STR values between about 3.5 to about 6.0 wt %.

Effect of Additive Addition

The majority of examples contained 0.25 wt % Ni which was added as a wetting aid to assist the wetting of the braze alloy against a stainless-steel substrate. The braze alloy composition tolerated a level of Ni up to 4.8 wt % whilst still maintaining an acceptable STR value, however it is expected that additive levels above 5.0 wt % may detrimentally affect the STR or liquidus temperature as indicated in comparative example 10 (C-10) which comprised 5.25 wt % additives. Higher levels of Ni and Ag (C-9, C-11) further confirmed this negative trend.

Figure 6F:
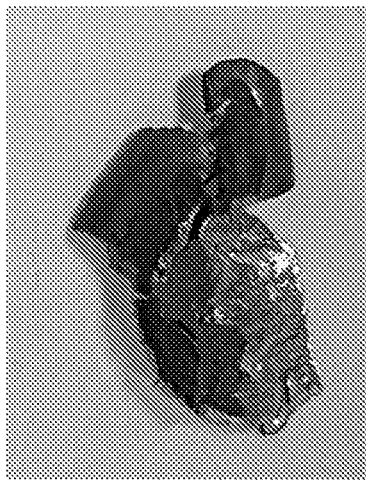
Figure 6A:
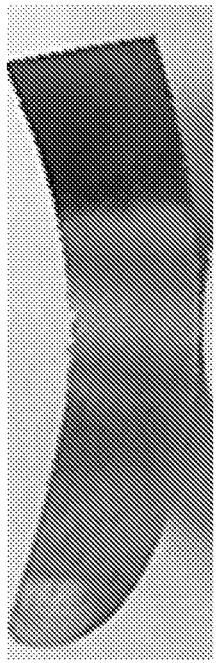
Figure 6C:
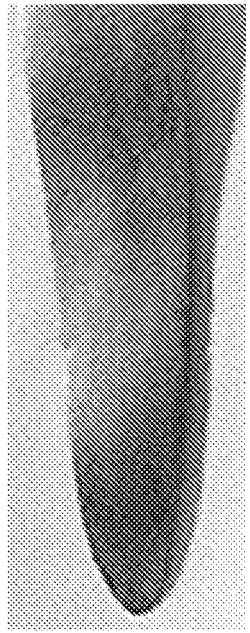
Figure 6E:

The effect of Sn addition was investigated through the addition of 1.0 wt % Sn to the composition for Example 5, which had a low STR of 12° C. The resultant composition (C-6) saw a detrimental deterioration in the STR value to 173° C. Other Sn containing compositions C-7 and C-8 also comprised high STR values of 116° C. and 185° C. respectively. The effect of Sn also saw a significant deterioration in the formability of Example 5 (100% formability), with the addition of 1.0 wt % Sn resulting in a dramatic fall in formability to 20% (FIG. 6f). Similar, the formability of sample 17 dropped from 100% to 30% (sample C-7), with the addition of 1.0 wt % Sn.

Braze Joint Performance

Figure 4:
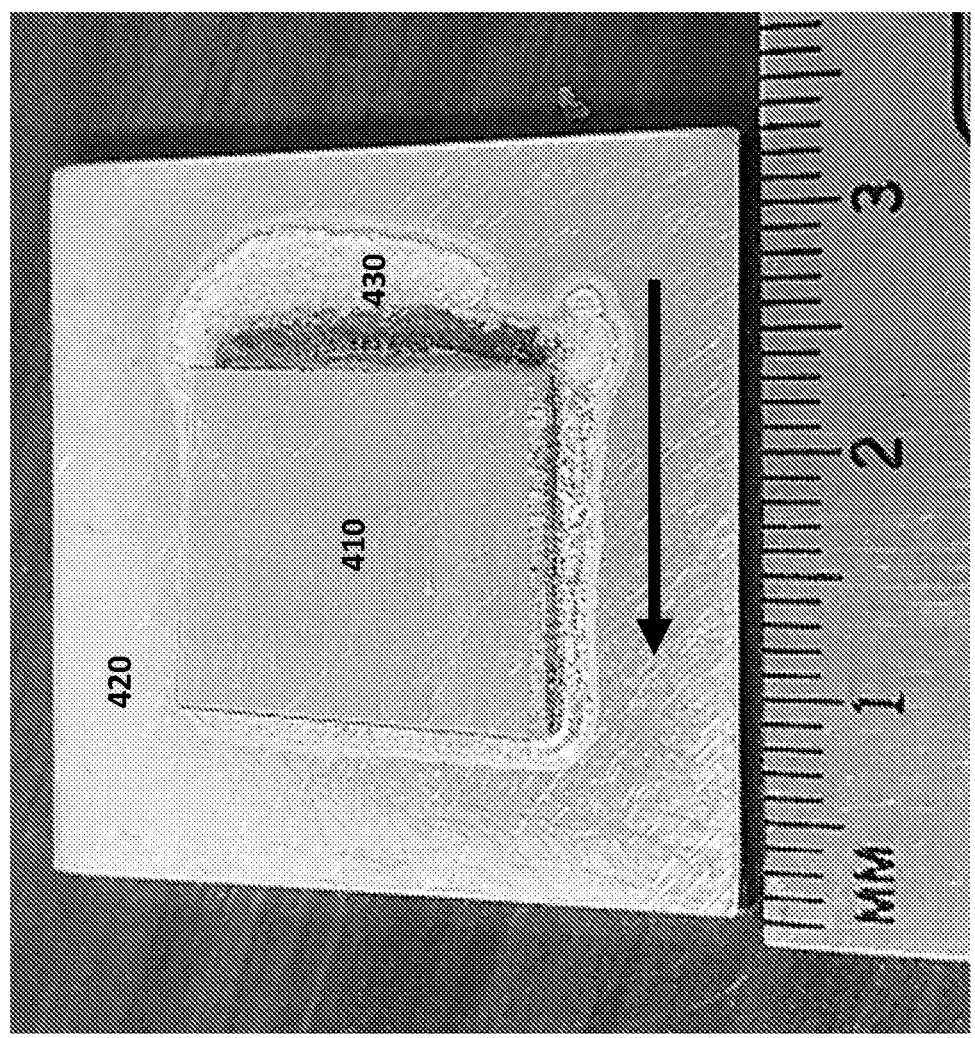
FIG. 4 is a photograph of the results of a braze flow test in a hydrogen atmosphere between copper and 304 stainless steel substrates joined together by braze alloy composition of Sample 14 in accordance with the present disclosure.
Figure 5:
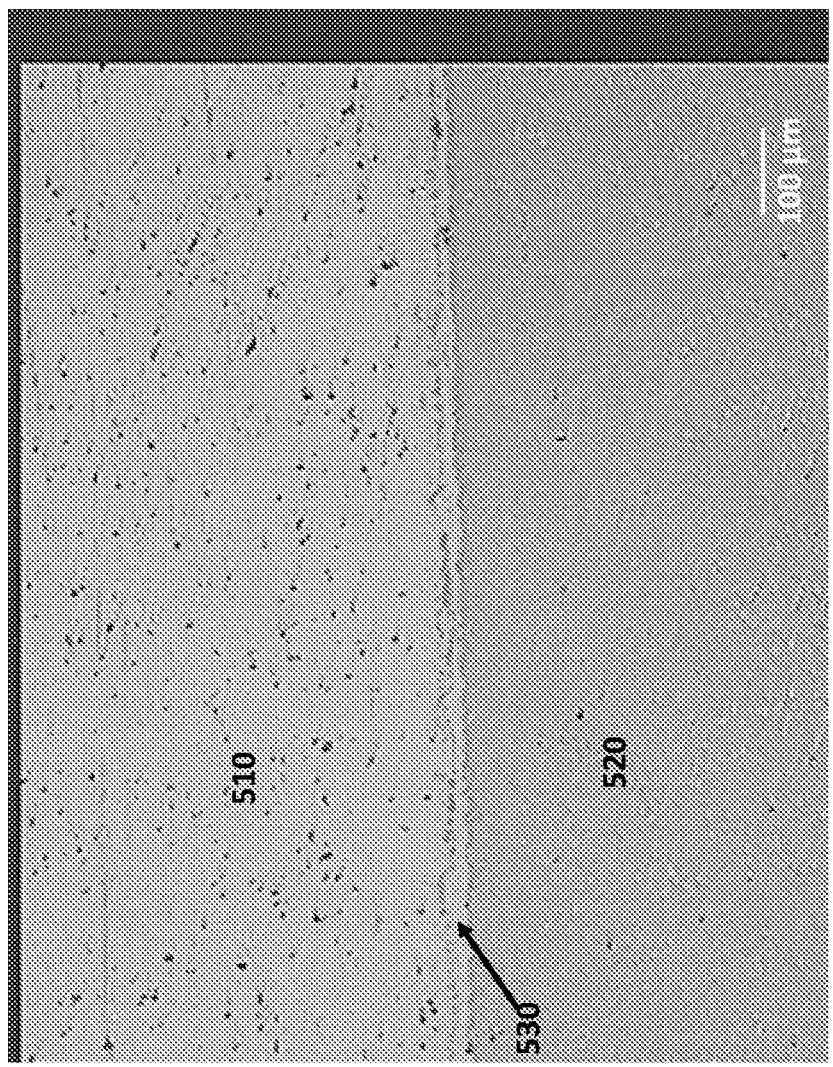
FIG. 5 is a microstructure image of a cross section of the braze joint of FIG. 4 in accordance with the present disclosure.

With reference to FIGS. 4 & 5, the braze composition (sample 13) was found to be capable of flowing between a copper 410, 510 and 304 stainless steel 420, 520 blind joint 430, 530, with the arrow in FIG. 4 indicating the direction of flow. As indicated in the cross-sectional image of the microstructure (FIG. 5), the copper 510 and the 304 stainless steel substrate 520 are joined together by the braze joint 530 having an average thickness of about 10 µm. As illustrated in FIG. 5, the braze joint provides a continuous and clean interface between the substrates. No liquation was evident. Testing confirmed that the braze joint met the maximum permissible leakage rate of closed vacuum assemblies of $1\times10^{-8}$ atm·cc/s or less as required for high vacuum assemblies.

A similar performance, with no observed liquation, was obtained when the braze alloy was used to braze a 304 stainless steel strip to a copper strip in a "T" configuration (not shown).

Figure 7A:
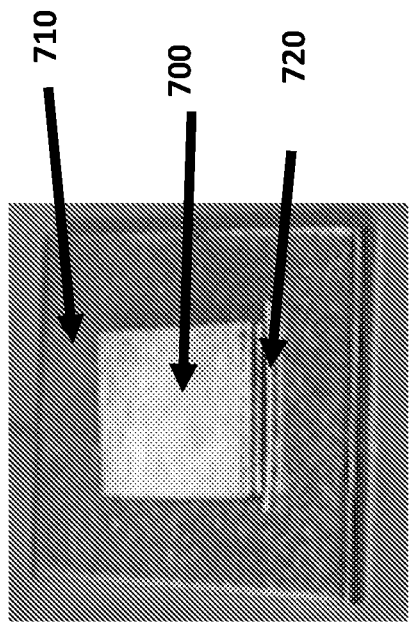
FIG. 7A is a photograph of a braze alloy wire abutting two components prior to brazing using the braze alloy of Sample 13 in accordance with the present disclosure.
Figure 7C:
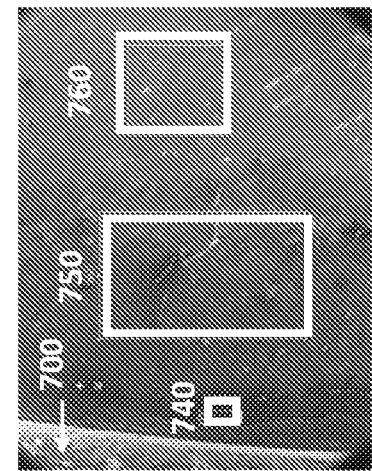
FIG. 7C is a scanning electron microscope (SEM) image of the braze joint of FIG. 7A after brazing in accordance with the present disclosure.
Figure 7B:
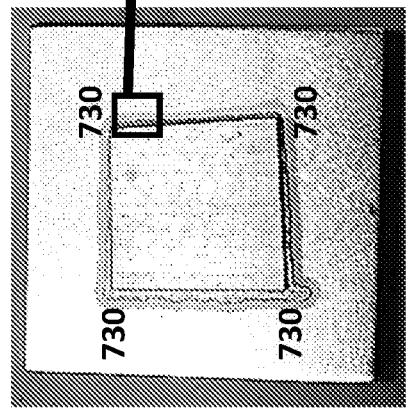
FIG. 7B is a photograph of the braze joint of FIG. 7A after brazing in accordance with the present disclosure.

FIG. 7A illustrates a copper plate 700 on a 304 stainless steel substrate 710, with a braze alloy wire (0.030" diameter) 720 abutting the two substrates. FIG. 7B illustrates that after brazing (1048° C. for 15 min under vacuum) the braze alloy forms naked eye braze fillets 730 on all four edges of the square blind joint coupon demonstrating excellent braze flow. Magnification (×30) of a section of the braze joint combined with EDS analysis discloses that the braze joint 730 immediate adjacent 740 and distal 750 to the copper plate 700 have a uniform smooth appearance (i.e. no evidence of liquation) with the EDS spectrum confirming a uniform concentration of brazing elements, with the EDS spectrum also confirming the presence of the 304 stainless steel 760.

TABLE 2

| Commercial Brand | Au (% wt) | Ni (% wt) | Cu (% wt) | Ge (% wt) | Liquidus Temp (° C.) | Solidus Temp (° C.) | STR Temp (° C.) |
|---|---|---|---|---|---|---|---|
| Nicoro ™ | 35 | 3 | 62 | — | 1030 | 1000 | 30 |
| Nioro ™ | 73.8 | 26.2 | — | — | 1010 | 980 | 30 |
| WESGO ™ 50Au-50Cu | 50 | — | 50 | — | 970 | 955 | 15 |
| WESGO ™ 35Au-65Cu | 35 | — | 65 | — | 1010 | 990 | 20 |
| GEMCO ™ | — | 0.25 | 87.75 | 12 | 975 | 880 | 95 |

Figure 8A:
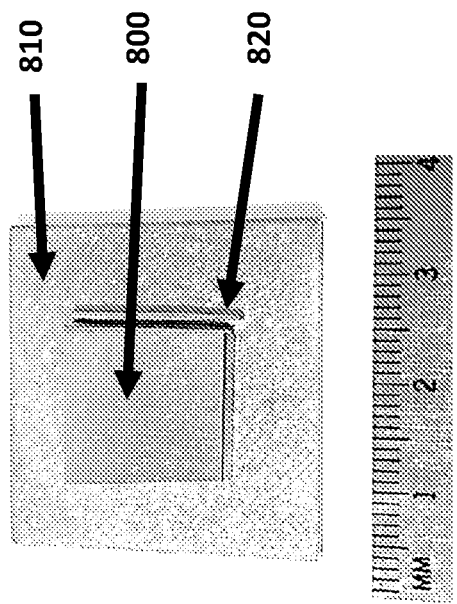
FIG. 8A is a comparative photograph of a conventional braze alloy wire abutting two components prior to brazing using the commercial braze alloy GEMCO™.
Figure 8C:
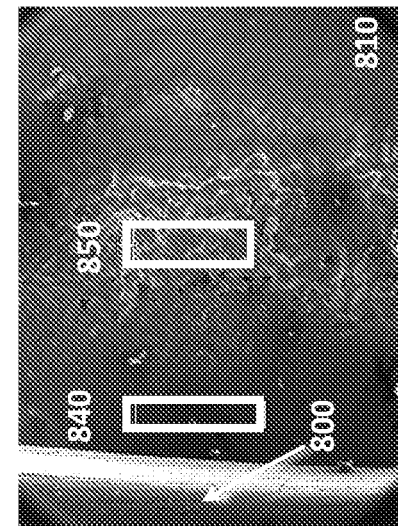
FIG. 8C is an SEM image of the braze joint of FIG. 8A after brazing in accordance with the present disclosure.
Figure 8B:
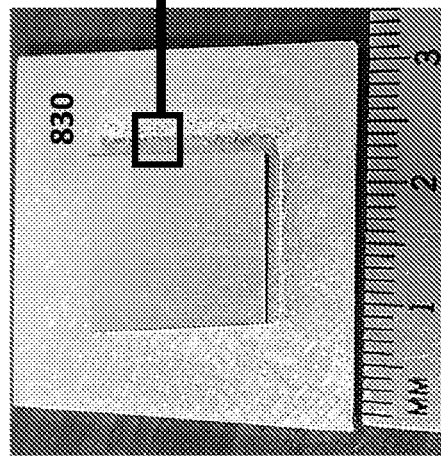
FIG. 8B is a photograph of the braze joint of FIG. 8A after brazing in accordance with the present disclosure.

FIG. 8A illustrates a copper plate 800 on a 304 stainless steel substrate 810, with a commercial braze alloy GEMCO™ wire (0.030" diameter) 820 abutting the two substrates. FIG. 8B illustrates that after brazing (1000° C. for 15 min under vacuum) the braze alloy forms a single naked eye braze fillets on the edge that the braze wire was placed, indicating limited braze flow and an inferior blind joint in comparison to the braze joint of FIG. 7B. Additionally, Magnification (×30) of a section of the braze joint 830 combined with EDS analysis discloses that of the sections of braze joint 840 and 850 to the copper plate 800, the section further from copper plate 850 had a rough appearance (i.e. evidence of liquation) with the EDS spectrum also confirming variation in elemental concentration of brazing elements over this section. Due to the variation in braze joint composition, the functionality of the brazed joint would be expected to be compromised.

It will be understood that modifications and variations may be affected without departing from the spirit and scope of the novel concepts of the present disclosure.

The invention claimed is:

1. A braze assembly, said braze assembly comprising a first component and a second component joined together by a first braze joint, said first braze joint comprising a composition configured to comprise a solidification temperature range of no more than 90° C. and a liquidus temperature in the range of 950° C. to 1060° C.; said first braze joint comprising, relative to the total weight of the braze joint composition: Cu, Ge and at least 0.5 wt % and no more than 30 wt % of the sum of one or more of Au+Pd+Pt; and the sum of Cu, Ge and (Pt+Pd+Au) is greater than 90 wt %, wherein said first braze joint comprises at least 2.0 wt % Ge, and wherein the braze joint composition comprises Au.

2. The braze assembly of claim 1, wherein the braze joint composition comprises in weight %:
   $54 \leq Cu \leq 95.5$;
   $2.0 \leq Ge \leq 10.0$ and optionally 0 to 5.0 of the sum of Al, Sn, In, Si, and B;
   $0.5 \leq$ the sum of Au, Pd and Pt $\leq 30.0$; and
   less than 1.0 incidental impurities.

3. The braze assembly of claim 1, wherein the braze joint composition comprises at least 1.0 wt % of one or more of Pt, Pd and Au.

4. The braze assembling of claim 1, wherein one or both of the first component and the second component comprises copper or copper alloys, Ni—Co—Fe alloys, ceramic, metallised ceramic; steel, including stainless steel; nickel and nickel alloys; and molybdenum and alloys thereof.

5. The braze assembly of claim 1, further comprising a second braze joint wherein the difference between the solidus temperature of the first braze joint and the liquidus temperature of the second braze joint is at least +15° C.

6. The braze assembly of claim 1, wherein the first braze joint comprises a first braze composition configured to obtain a solidus temperature of at least 950° C. and a second braze composition configured to obtain a liquidus temperature of no more than 1017° C.

7. A high voltage vacuum tube comprising:
   a vacuum tube envelope comprising an interior;
   an anode assembly disposed within the interior of the vacuum tube envelope; and
   a cathode assembly disposed within the interior of the vacuum tube envelope that emits an electron beam to strike a target surface of the anode assembly and form electromagnetic radiation,
   wherein said high voltage vacuum tube comprises the braze assembly according to claim 1, wherein at least a portion of the braze joint is exposed to the interior of the vacuum tube envelope and wherein at least one of the first and second component form part of one or more of the vacuum tube envelope, the anode assembly and the cathode assembly.

8. The high voltage vacuum tube according to claim 7, wherein the braze joint composition comprises in weight %:
   $60 \leq Cu \leq 95$;
   $0.5 \leq Ge \leq 9.5$;
   $0 \leq$ sum of one or more of Cr, In, Sn, Si, Al $\leq 5.0$;
   $0 \leq B \leq 1.25$;
   $0 <$ sum of one or more of Au, Pd and Pt $< 18.0$; and
   incidental impurities.

9. A braze joint composition comprising in weight %, relative to the total weight of the braze joint composition:
   $54 \leq Cu \leq 95.5$;
   $2.0 \leq Ge \leq 10.0$ and optionally 0 to 5.0 of the sum of Al, Sn, In, Si, and B;
   $0.5 \leq$ the sum of Au, Pd and Pt $\leq 30.0$; and
   less than 1.0 incidental impurities,
   wherein the braze joint composition is configured to comprise a solidification temperature range of no more than 90° C. and a liquidus temperature in the range of 950° C. to 1060° C.;
   wherein the braze joint composition is configured to obtain a temperature difference between the solidus temperature and the liquidus temperature of no more than 40° C.

10. The braze joint composition of claim 9, comprising
   $66 \leq Cu \leq 95.5$;
   $2.0 \leq Ge \leq 10.0$ and optionally 0 to 5.0 of the sum of Al, Sn, In, Si, and B;
   $0.5 \leq$ the sum of Au, Pd and Pt $\leq 18.0$; and
   less than 1.0 incidental impurities.

11. The braze joint composition of claim 9, wherein the Germanium content is in the range of 2.5 to 8.0 wt %.

12. A braze joint composition comprising in weight %, relative to the total weight of the braze joint composition:
   $54 \leq Cu \leq 95.5$;
   $2.0 \leq Ge \leq 10.0$ and optionally 0 to 5.0 of the sum of Al, Sn, In, Si, and B;
   $0.5 \leq$ the sum of Au and Pt $\leq 30.0$; and
   less than 1.0 incidental impurities,
   wherein the braze joint composition is configured to comprise a solidification temperature range of no more than 90° C. and a liquidus temperature in the range of 950° C. to 1060° C.

13. A braze alloy composition comprising in weight %, relative to the total weight of the braze alloy composition:
54≤Cu≤95.5;
2.0≤Ge≤10.0 and optionally 0 to 5.0 of the sum of Al, Sn, In, Si, and B;
0.5≤the sum of Au and Pt≤30.0; and
less than 1.0 incidental impurities,
wherein the braze alloy composition is configured to comprise a solidification temperature range of no more than 90° C. and a liquidus temperature in the range of 950° C. to 1060° C.

14. The braze alloy composition of claim 13, comprising 66≤Cu≤95.5;
2.0≤Ge≤10.0 and optionally 0 to 5.0 of the sum of Al, Sn, In, Si, and B;
0.5≤the sum of Au and Pt≤18.0; and
less than 1.0 incidental impurities.

15. The braze alloy composition of claim 13, wherein the Germanium content is in the range of 2.5 to 8.0 wt %.

16. The braze alloy composition of claim 13, wherein the sum of Al, Sn, In, Si, and B is no more than 3.0 wt %.

17. The braze alloy composition of claim 13, wherein the braze alloy composition comprises at least 0.5 wt % Au.

18. The braze alloy composition of claim 13, wherein the braze alloy composition is configured to obtain a temperature difference between the solidus temperature and the liquidus temperature of no more than 40° C.

19. A braze alloy composition comprising in weight %, relative to the total weight of the braze alloy composition:
54≤Cu≤95.5;
2.0≤Ge≤10.0 and optionally 0 to 5.0 of the sum of Al, Sn, In, Si, and B;
0.5≤the sum of Au, Pd and Pt≤30.0; and
less than 1.0 incidental impurities,
wherein the braze alloy composition is configured to comprise a solidification temperature range of no more than 90° C. and a liquidus temperature in the range of 950° C. to 1060° C.;
wherein the braze alloy composition is configured to obtain a temperature difference between the solidus temperature and the liquidus temperature of no more than 40° C.

20. A braze assembly comprising a braze alloy composition configured to comprise a solidification temperature range of no more than 90° C. and a liquidus temperature in the range of 950° C. to 1060° C.; said braze alloy composition comprising, relative to the total weight of the braze alloy composition: Cu, Ge and at least 0.5 wt % and no more than 30 wt % of the sum of one or more of Au+Pd+Pt; and the sum of Cu, Ge and (Pt+Pd+Au) is greater than 90 wt %, wherein said braze alloy composition comprises at least 2.0 wt % Ge, and wherein the braze alloy composition comprises Au.

21. The braze assembly of claim 20, wherein the braze alloy composition comprises in weight %:
54≤Cu≤95.5;
2.0≤Ge≤10.0 and optionally 0 to 5.0 of the sum of Al, Sn, In, Si, and B;
0.5≤the sum of Au, Pd and Pt≤30.0; and
less than 1.0 incidental impurities.

22. The braze assembly of claim 20, wherein the braze alloy composition comprises at least 1.0 wt % of one or more of Pt, Pd and Au.

23. The braze assembly of claim 20, wherein the Germanium content of the braze alloy composition is in the range of 2.5 to 8.0 wt %.

24. The braze assembly of claim 20, wherein the sum of Al, Sn, In, Si, and B of the braze alloy composition is no more than 3.0 wt %.

25. The braze assembly of claim 20, wherein the braze alloy composition is configured to obtain a temperature difference between the solidus temperature and the liquidus temperature of no more than 40° C.

26. The braze assembly of claim 20, wherein the braze alloy composition comprises in weight %:
54≤Cu≤95.5;
2.0≤Ge≤10.0 and optionally 0 to 5.0 of the sum of Al, Sn, In, Si, and B;
0.5≤the sum of Au and Pt≤30.0; and
less than 1.0 incidental impurities,
wherein the braze alloy composition is configured to comprise a solidification temperature range of no more than 90° C. and a liquidus temperature in the range of 950° C. to 1060° C.

27. The braze assembly of claim 20, wherein the braze alloy composition is in the form of a foil with a thickness in the range of 0.001 inches to 0.010 inches (corresponding to a range of 25 μm to 250 μm) or a wire with a diameter in the range of 0.015 inches to 0.10 inches (corresponding to a range of 380 μm to 2540 μm).

* * * * *